US012672608B1

(12) United States Patent
Erickson et al.

(10) Patent No.: US 12,672,608 B1
(45) Date of Patent: Jul. 7, 2026

(54) HYBRID POWER SUPPLIES

(71) Applicant: Briggs & Stratton, LLC, Wauwatosa, WI (US)

(72) Inventors: Melissa Schnur Erickson, Pewaukee, WI (US); Andrew John Joestgen, Oak Creek, WI (US); Bryce Metcalf, New Berlin, WI (US); Andre Molinaro, Wauwatosa, WI (US); Michael D. Pitcel, Waukesha, WI (US)

(73) Assignee: BRIGGS & STRATTON, LLC, Wauwatosa, WI (US)

( * ) Notice: Subject to any disclaimer, the term of this patent is extended or adjusted under 35 U.S.C. 154(b) by 666 days.

(21) Appl. No.: 18/121,881

(22) Filed: Mar. 15, 2023

Related U.S. Application Data

(60) Provisional application No. 63/320,447, filed on Mar. 16, 2022.

(51) Int. Cl.
| | |
|---|---|
| B60L 50/61 | (2019.01) |
| A01D 34/00 | (2006.01) |
| A01D 69/02 | (2006.01) |
| B60L 7/16 | (2006.01) |
| B60L 50/16 | (2019.01) |

(52) U.S. Cl.
CPC ......... A01D 69/025 (2013.01); A01D 34/006 (2013.01); B60L 7/16 (2013.01); B60L 50/16 (2019.02); B60L 50/61 (2019.02); B60L 2210/30 (2013.01)

(58) Field of Classification Search
CPC ....... A01D 69/025; A01D 34/006; B60L 7/16; B60L 50/16; B60L 50/61; B60L 2210/30
See application file for complete search history.

(56) References Cited

U.S. PATENT DOCUMENTS

| | | | |
|---|---|---|---|
| 8,863,485 B2 | 10/2014 | Pitcel et al. | |
| 9,694,693 B1 | 7/2017 | Herman et al. | |
| 2017/0302107 A1* | 10/2017 | Saussele | H02J 7/35 |
| 2018/0115265 A1* | 4/2018 | Nayfeh | B64U 50/19 |
| 2018/0269829 A1* | 9/2018 | Narla | H02S 50/10 |
| 2018/0326863 A1* | 11/2018 | Soki | H01M 50/209 |
| 2019/0202439 A1* | 7/2019 | Cho | B60W 50/0098 |
| 2021/0394916 A1* | 12/2021 | Baig | H02J 9/061 |

* cited by examiner

Primary Examiner — Lincoln D Donovan
Assistant Examiner — Alex W Lam
(74) Attorney, Agent, or Firm — Foley & Lardner LLP

(57) ABSTRACT

A hybrid power supply includes an engine configured to rotate a crankshaft, a generator including a rotor and a stator, the rotor coupled to and configured to rotate with the crankshaft to generate alternating-current power, a generator controller including a converter configured to convert the alternating current power to direct current power, and a battery pack electrically connected to the generator controller. The generator controller and the battery pack are configured to be electrically connected to a power bus of an equipment to allow direct current power to travel between the equipment and the hybrid power supply.

16 Claims, 26 Drawing Sheets

500

500

HYBRID POWER SUPPLIES

CROSS-REFERENCE TO RELATED PATENT APPLICATIONS

This application claims the benefit of and priority to U.S. Provisional Application No. 63/320,447, filed Mar. 16, 2022, the entire disclosure of which is hereby incorporated by reference herein.

BACKGROUND

The present invention relates generally to the field of power supplies, and more particularly to the field of power supplies for outdoor power equipment, other power equipment, and secondary or standby power systems.

SUMMARY

One embodiment relates to a hybrid power supply including an engine configured to rotate a crankshaft, a generator including a rotor and a stator, the rotor coupled to and configured to rotate with the crankshaft to generate alternating-current power, a generator controller including a converter configured to convert the alternating current power to direct current power, and a battery pack electrically connected to the generator controller. The generator controller and the battery pack are configured to be electrically connected to a power bus of an equipment to allow direct current power to travel between the equipment and the hybrid power supply.

Another embodiment relates to outdoor power equipment including a power bus configured to electrically connect to a battery via one or more battery terminals, a first motor electrically connected to the power bus and configured to be driven by direct current power from the battery, and a hybrid power supply. The hybrid power supply includes an engine configured to rotate a crankshaft, a generator configured to convert the rotation of the crankshaft to alternating current power, the generator including a converter configured to convert the alternating current power to direct current power, and a battery pack electrically connected to the converter. The converter and the battery pack are electrically connected to the power bus to allow direct current power to travel between the hybrid power supply and the power bus.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, hybrid power supplies are shown for use in outdoor power equipment, vehicles, battery charging stations, homes, businesses, etc. Outdoor power equipment includes lawn mowers, riding tractors, snow throwers, fertilizer spreaders, salt spreaders, chemical spreaders, pressure washers, tillers, log splitters, zero-turn radius (ZTR) mowers, walk-behind mowers, wide area walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. Vehicles include utility vehicles, recreational vehicles, tractor units of tractor-trailers, personal electric vehicles, or any other vehicle that includes electrical components that can be powered by the hybrid power supply.

Figure 1:
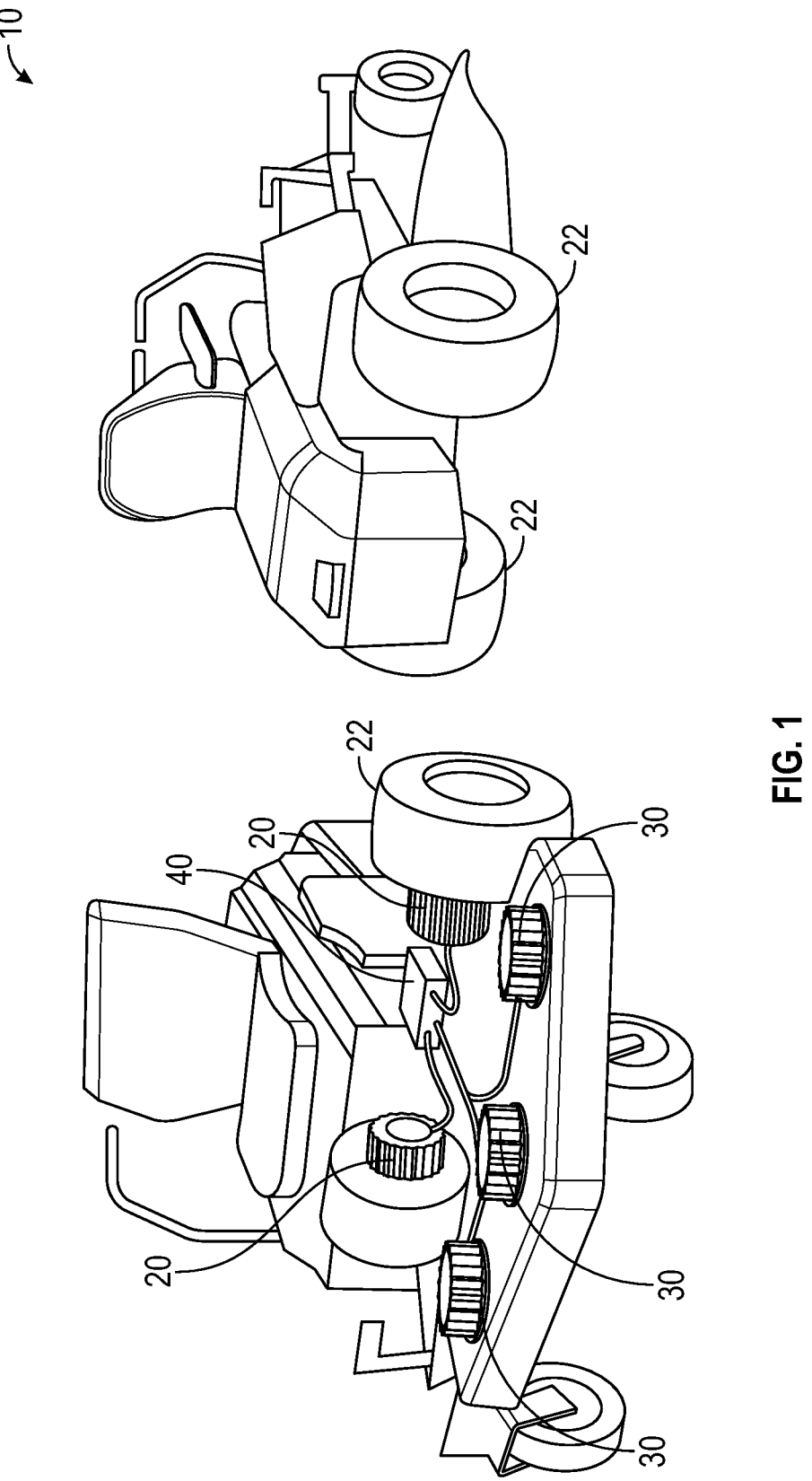
FIG. 1 is a perspective view of outdoor power equipment, according to an exemplary embodiment.

Referring to FIG. 1, front and back perspective views of outdoor power equipment are shown according to an exemplary embodiment. The outdoor power equipment in FIG. 1 is a ZTR mower 10. The ZTR mower 10 includes a plurality of electric motors, including two drive motors 20 and three chore motors 30 coupled to a power supply 40. The drive motors 20 are configured to turn the drive wheels 22 of the ZTR mower 10, while the chore motors 30 are configured to rotate the mower blades. Other outdoor power equipment may include only chore motors or only drive motors. Various chore motors may drive other rotary components (e.g., an auger on a snow thrower, a pump on a pressure washer, etc.) of the outdoor power equipment.

Power Supplies

Figure 2:
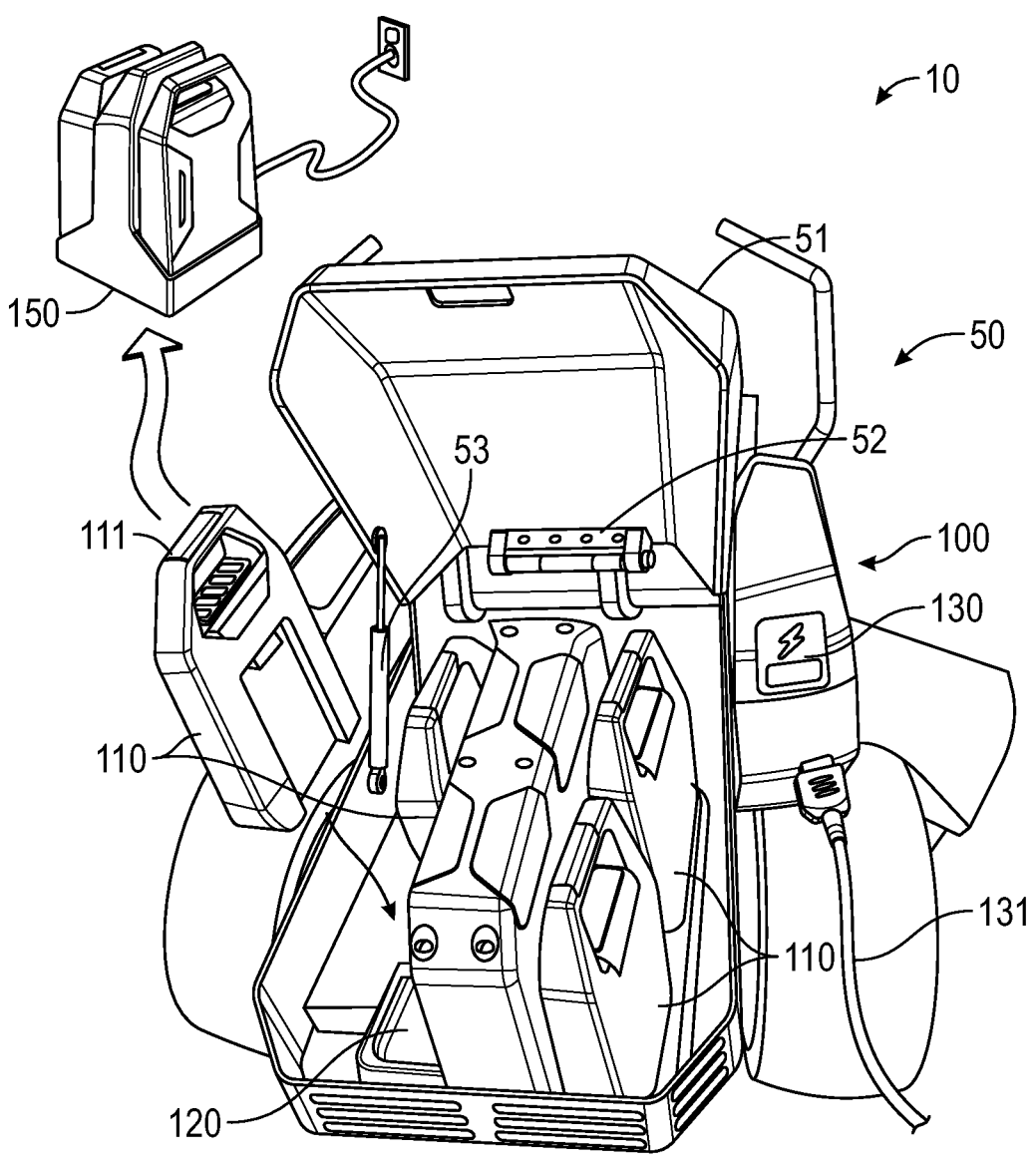
FIG. 2 is a perspective view of a power supply for the outdoor power equipment of FIG. 1, according to an exemplary embodiment.
Figure 3:
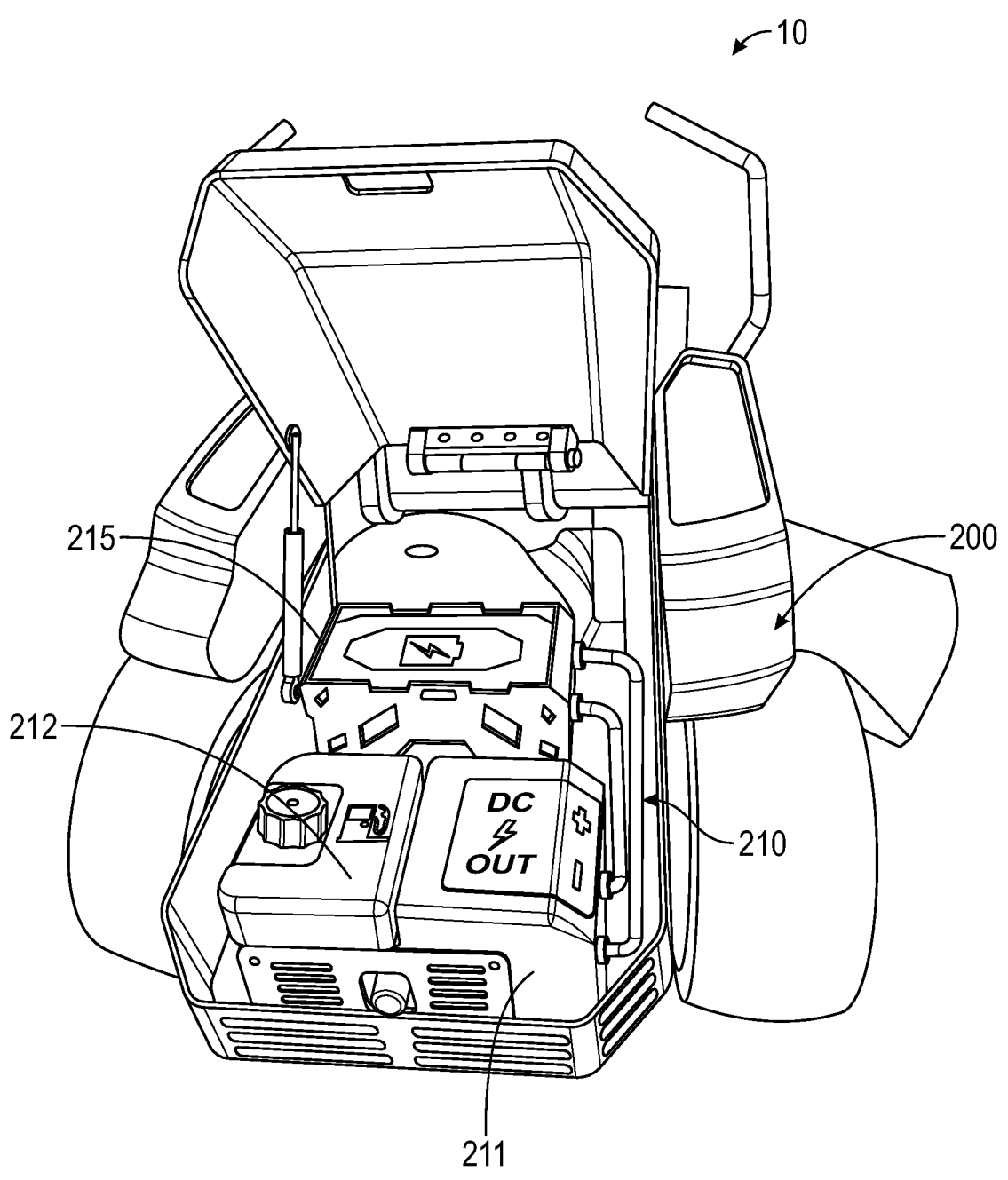
FIG. 3 is a perspective view of a power supply for the outdoor power equipment of FIG. 1, according to an exemplary embodiment.
Figure 4:
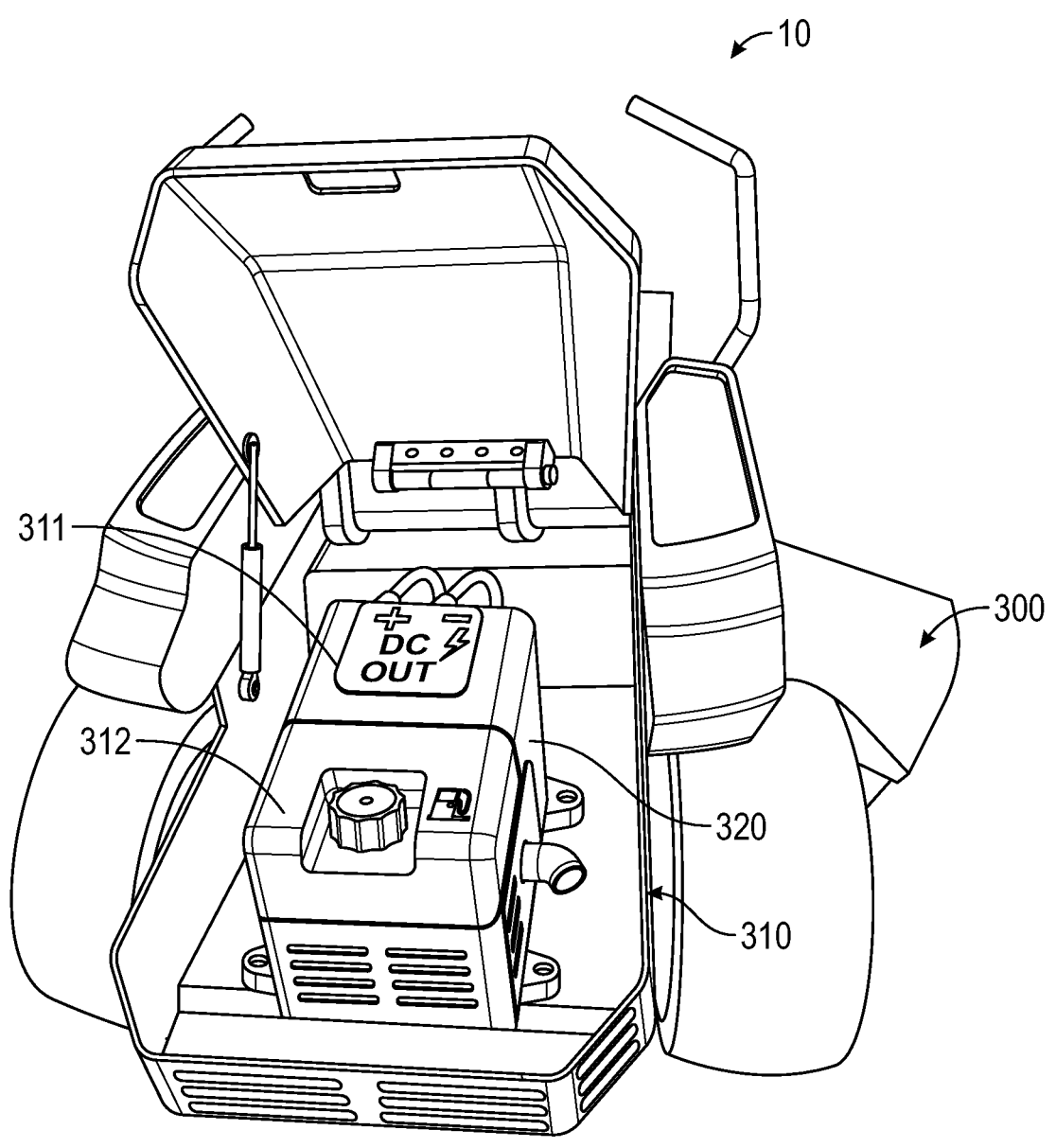
FIG. 4 is a perspective view of a power supply for the outdoor power equipment of FIG. 1, according to an exemplary embodiment.

FIGS. 2-4 respectively illustrate power supplies 100, 500, 300 coupled to the ZTR mower 10, according to exemplary embodiments. The power supplies 100, 200, 300 are configured to supply power to the ZTR mower 10, including, for example, drive motors 20, chore motors 30, and any other electrical components (e.g., display screens, switches, buttons, fans, lights, etc.).

Referring to FIG. 2, power supply 100 includes a plurality of batteries 110 (e.g., rechargeable lithium-ion battery packs), each configured to be received in a battery receptacle 120 (e.g., slot, receiver, port, etc.). The batteries 110 may function as the prime or sole power supply for a piece of outdoor power equipment. In the embodiment shown, power supply 100 includes four batteries 110. The outdoor power equipment may function with only one of the four batteries inserted into a receptacle, additional batteries may be inserted into respective receptacles 120 in order to expand the capacity (e.g., runtime, travel range, power output etc.) of the power supply 100. Each battery 110 may include a handle 111 to allow a user to lift and carry the battery 110. Each battery 110 includes terminals that are configured to contact corresponding terminals in the receptacle 120 to transfer electricity and data between the battery 110 and the outdoor power equipment. The battery 110 may be installable in the receptacle 120 by positioning the battery 110 over the receptacle and lowering the battery into the receptacle. The battery 110 may engage with the receptacle 120, such that the terminals of the battery 110 and receptacle 120 make contact, under the force of gravity without additional force supplied by the user. The batteries 110 may be removable by pulling on the handle 111 and lifting the battery 110 out of the receptacle 120. The batteries 110 may be chargeable using a charger 150 electrically coupled to another power supply (e.g., grid power). Alternatively or additionally, the outdoor power equipment may include a charging port 130 configured to receive a charging cable 131 coupled to another power supply (e.g., grid power). The batteries 110 may be interchangeable with other outdoor power equipment. For example, the same batteries 110 may be used in the ZTR mower 10 and in a snow blower.

Referring now to FIG. 3, power supply 200 is a hybrid power supply including a generator 210 and at least one battery 215 (e.g., a rechargeable lithium-ion battery pack, a rechargeable lead acid battery pack, etc.). The generator 210 includes an internal combustion engine within a housing 211, an alternator within the housing 211, a fuel tank 212, and a controller. The internal combustion engine draws in fuel from the fuel tank 212 into an engine block. Fuel is directed through the engine block into one or more cylinders, each housing a piston. Fuel is supplied into cylinder heads (e.g., with an injector, like an electronic fuel injector (EFI)), mixed with air, and compressed between the cylinder head and piston. The gaseous fuel and air mixture is then ignited by a spark plug that extends into the cylinder head. Ignition of the fuel and air within the cylinder head causes the gases within the cylinder head to rapidly expand, which drives the piston away from the cylinder head and along a cylinder axis defined by the cylinder in which the piston is received. The coupling between the pistons and a crankshaft of the engine causes the crankshaft to rotate about a crankshaft axis in response to piston movement about the cylinder axes. The engine may have any number of cylinders (e.g., one cylinder, two cylinders, four cylinders, etc.). The engine may have two cylinders arranged in a v-twin configuration.

The rotary motion of the crankshaft about the crankshaft axis caused by the reciprocating pistons can then be used by the alternator assembly to generate electricity. The alternator assembly includes a stator and a rotor. The rotor is coupled to the crankshaft so that the rotor rotates in unison with the crankshaft. In some examples, the rotor includes magnets (e.g., permanent magnets) extending around a portion of the rotor to produce magnetic fields within the alternator assembly. As the rotor rotates within the stator, the magnetic fields created by the magnets on the rotor rotate as well to produce a rotating magnetic flux. The stator includes a series of coils (e.g., turned copper wire) spaced about its circumference to interact with and electromagnetically oppose rotational motion of the rotor. Accordingly, when the rotor and associated magnets rotate within the stator, the rotating magnetic flux produced by the rotor will induce a current within the coils. The spacing between the magnets on the rotor and the coils within the stator and the rotary motion of the rotor generates an alternating current (AC) electrical power output. The AC electrical power output by the alternator assembly is directed along one or more wires to the controller. The controller may include a converter, rectifier, inverter, or other power electronics that transforms the AC electrical power received from the alternator assembly to DC power. In some embodiments, the AC to DC conversion power electronics may be a separate component from the controller.

DC power from the controller of the generator 210 is supplied to the battery 215 to charge the battery 215. The battery 215 may then supply power to the electrical components of the outdoor power equipment (e.g., the drive motors 20 and chore motors 30 of the ZTR motor 10). In some embodiments, the controller of the generator 210 may supply a portion of the power generated directly to the electrical components of the outdoor power equipment. In some embodiments, the generator 210 may charge the battery 215 and power the electrical components of the outdoor power equipment simultaneously. In some embodiments, the battery 215 may function only as backup when the generator 210 is not able to provide power (e.g., when the fuel tank 212 is empty). In some embodiments, the battery 215 and the generator 210 supply power to the electrical components of the outdoor power equipment simultaneously. In some embodiments, the battery 215 provides power to a first subset of the electrical components while the generator 210 supplies power to a second subset of the electrical components. For example, the generator 210 may supply power to the drive motors 20 of the while the battery 215 supplies power to the chore motors 30.

In some embodiments, only the battery 215 supplies power to the electrical components, and the generator 210 supplies power to the battery 215 only when the battery 215 is below a predetermined level of charge. For example, the ZTR mower 10 may be powered only by the battery 215 until the battery charge falls below 30, 20, or 10 percent. The controller may be configured to receive or detect the battery charge of the battery 215 and to automatically start the internal combustion engine of the generator 210 when the battery charge falls below the predetermined level. When the battery 215 is charged to full capacity or to a predetermined amount (e.g., 80 or 90 percent charged), the controller may detect or receive an indication that the battery is fully charged and may automatically stop the internal combustion engine of the generator 210. When the outdoor power equipment is running only on battery power and the internal combustion engine of the generator is powered off, the outdoor power equipment produces less noise than outdoor power equipment powered by an always-on generator or traditional internal combustion engine-powered equipment. In some embodiments, the battery 215 may also be charged by an external power source (e.g., grid power). For example, the battery 215 may be initially charged by grid power and the generator 210 may act as a backup to charge the battery 215 when the battery charge falls below a predetermined level. The generator 210 may also have an integrated battery configured to supply power to start the internal combustion engine, absorb regenerated energy from the motors, and supply power to the motors during load surges. These functions are further described below with respect to the battery 320.

Referring now to FIG. 4, power supply 300 includes a generator 310 (e.g., a generator similar to generator 210). Like the generator 210, the generator 310 includes an internal combustion engine within a housing 311, an alternator within the housing 311, a fuel tank 312, and a controller. The controller includes a converter (e.g., a rectifier) configured to convert the AC power from the alternator to DC power. Inverter generator 310 is configured to supply DC power directly from the alternator (e.g., via the converter) to all of the electrical components of the outdoor power equipment. The controller is also configured to detect a variable electrical load on the generator 310. For example, the electrical load from the drive motors 20 may increase when the ZTR mower 10 is being driven uphill. The controller detects the increase in load and controls the speed of the internal combustion engine (e.g., the rotational speed of the crankshaft) such that the generator 310 produces enough power to supply the outdoor power equipment. In some embodiments, the controller may be configured to deactivate one or more cylinders of the internal combustion engine when the power demand is low.

The generator 310 includes an integrated battery 320. The battery 320 operates at the same nominal voltage as that generated by the converter (e.g., between 48V and 96V), so that the internal combustion engine and alternator can charge the battery 320. In some embodiments, the battery 320 can supply power to one or more motors or other electrical components of the outdoor power equipment. In some embodiments, the alternator of the generator 310 may be configured to act as a starter motor (e.g., an integrated starter generator, a reversible alternator, etc.) for the internal combustion engine. For example, the battery 320 may be configured to supply an electrical current to the alternator causing the rotor to rotate. Because the rotor is coupled to the crankshaft of the internal combustion engine, the rotation of the rotor provides the initial rotation of the crankshaft needed to start the engine. Once the crankshaft is rotating at a speed necessary to supply sufficient power, the internal combustion engine may begin normal operation (e.g., when the internal combustion engine is in a running condition) and the battery 320 may stop supplying power to the alternator. The alternator may also supply power to the battery 320 (e.g., via the converter) to charge the battery 320 to a state of charge sufficient to start the engine the next time the generator 300 is turned on (e.g., 50% state of charge).

In some embodiments, the battery 320 is configured to supply power to at least one of the motors of the outdoor power equipment until the internal combustion engine is in a running condition. For example, the controller may receive an indication that one or more motors are to be activated, for example, when a user presses a start button or turns an ignition key. The controller may start the engine while simultaneously sending power from the battery 320 to one or more motors or other electrical components of the outdoor power equipment. Thus, the motors may receive power from the battery 320 immediately, while the internal combustion engine is in the process of starting. Once the internal combustion engine reaches a running condition, the controller may stop the flow of power from the battery to the motor, and the internal combustion engine alone will supply power to the motor. In some embodiments, both the battery 320 and the internal combustion engine may supply power to the motors simultaneously. For example, when the internal combustion engine is in the process of starting up, it may produce only a percentage of the power necessary to power the motors. The battery 320 may supply the additional power demanded by the motors. The amount of power supplied by the battery 320 may decrease as the engine speed increases until the internal combustion engine is supplying all of the necessary power. When the electrical load from the motors and/or the other electrical components of the outdoor power equipment increases, the engine speed must be increased to produce the amount of power demanded. While the speed of the crankshaft of the internal combustion engine is in the process from increasing from a first speed to a second speed in order to produce the demanded power, the battery 320 may supply additional power until the crankshaft reaches the second speed. Once the crankshaft reaches the speed at which the internal combustion engine is producing enough power to supply the electrical load, the battery 320 may be configured to stop supplying power to the motors or other electrical components. Thus, the battery 320 may be configured to supply power to the motors and other electrical components of the outdoor power equipment only when the internal combustion engine is unable to supply sufficient power to meet the demands of the motors and other electrical components. The battery 320 may also supply power to any fans (e.g., cooling fans) or other electrical systems that stay on after the internal combustion engine is turned off. The battery 320 may have a rated power output between approximately 5 percent and approximately 30 percent of the rated power output of the internal combustion engine, or between approximately 5 percent and approximately 50 percent. For example, the battery 320 may have a rated maximum power output of between about 0.5 kilowatts and about 1.5 kilowatts. The battery 320 may not be able to supply enough current for continuous long-term operation of all of the electrical components as a primary power source, but may supply sufficient power to start the engine, supply additional power for transient load increases, and absorb regenerative loads. The lower power output and capacity of the battery 320 allows for a reduction in battery size/capacity compared to batteries in conventional hybrid vehicles.

Referring still to FIG. 4, the battery 320 may be configured to absorb energy from motors coupled to the power supply 300 (e.g., drive motors 20 and chore motors 30 of ZTR mower 10) when the motors decelerate, using regenerative braking. Electric motors can function as generators that convert mechanical energy into electrical energy, resulting in a reduction in mechanical energy (e.g., a slowing of the rotational speed of the motor and coupled implements). The battery 320 can absorb electricity from and be charged by the power generated by the motors as the rotational speed decreases. In order to minimize the capacity requirements, and therefore cost and size, of the battery, the internal combustion engine may act as an "air brake" to absorb some of the power generated by the slowing of the motors. In response to a user input indicating that one or more motors should slow down or stop (e.g., hitting a brake causing the ZTR mower 10 to slow down, turning off the mower blades of the ZTR mower 10, etc.), the electronic fuel injection system of the generator 310 may be configured to stop supplying fuel to the cylinders of the internal combustion engine, and the internal combustion engine is configured to absorb the energy generated by the motors. Electrical power generated by the slowing motors is directed to the alternator, which operates in reverse using the electrical power to rotate the rotor of the alternator and the crankshaft of the internal combustion engine. An intake valve of each cylinder of the internal combustion engine opens, and air is drawn into the cylinder during an intake phase, similar to the intake phase when the internal combustion engine is generating power except that no fuel is injected. The piston rotates the crankshaft and then compresses the air in the cylinder in a compression phase, similar to the compression phase when the internal combustion engine is generating power. However, instead of firing a sparkplug, the air is partially compressed by the piston and then the exhaust valve is opened to release the compressed air from the cylinder. The exhaust valve is closed, and the intake valve opens to draw new air into the cylinder, and the process is repeated. The compression of the air in the compression phase slows the movement of the piston and the corresponding rotation of the crankshaft. Thus, the internal combustion engine operates in reverse, with the crankshaft driving the pistons, using an intentionally inefficient air intake and compression cycle to absorb the energy generated by the motors (e.g., the energy generated that exceeds the storage capability of the battery and/or other energy storage devices). In some embodiments, the throttle plate may remain closed or partially closed to add a flow restriction so that it takes more work for the engine to draw air into the cylinders.

The remaining electricity generated charges the battery 320. Because the internal combustion engine absorbs some of the energy generated by the motors, the battery 320 can have a lower capacity than if it absorbed all of the electricity generated by the motors. When the motor being slowed is a drive motor of the outdoor power equipment of vehicle (e.g., drive motors 20 of the ZTR mower 10), using the internal combustion engine as an air brake as described above can supplement the braking capacity of friction brakes and slow the movement of the outdoor power equipment or vehicle over a surface (e.g., a lawn, a road, etc.). When the motor being slowed is a chore motor of the outdoor power equipment of vehicle (e.g., chore motors 30 of the ZTR mower 10), using the internal combustion engine as an air brake as described above can slow or quickly stop the auxiliary tool (e.g., mower blades, a snow blower auger, etc.) coupled to the motor. In some embodiments, the generator may also include a resistor bank to convert some of the power generated by the motors to heat energy. The resistors can be convectively cooled by one or more fans. Similar methods may also be used in the hybrid power supply 200. Because the internal combustion engine absorbs much of the regenerated electricity from the motors, the battery 320 may be charged to a higher percentage of maximum capacity because less capacity is required to be available to absorb regenerated electricity. For example, the battery can be charged to 90 percent, leaving 10 percent capacity available for absorbing regenerated electricity. If the internal combustion engine did not absorb any of the regenerated electricity from the motors, the battery may only be able to be charge to, for example, 70 percent or 80 percent so that enough capacity is available to absorb regenerated electricity. In some embodiments, when some motors are being stopped or slowed while other motors are continuing to run or are speeding up, the power generated by the slowing motors may be used to power the other motors. For example, if a user inputs a command to turn off the chore motors 30 of ZTR mower 10 while driving the drive motors 20 at a constant speed, the energy generated by the slowing chore motors 30 can be used to power the drive motors 20.

Any of the power supplies 100, 200, 300 may include an inverter configured to convert DC power to clean, stable AC power (e.g., AC power with lower voltage distortion than the AC power generated by the alternator). For example, the controllers of power supplies 200, 300 may include an inverter. The AC power may be supplied to an AC power outlet on the outdoor power equipment, vehicle, or the housing of the generator, and other devices may be plugged into the AC power outlet such that AC power can be supplied to the other devices.

Figure 5:
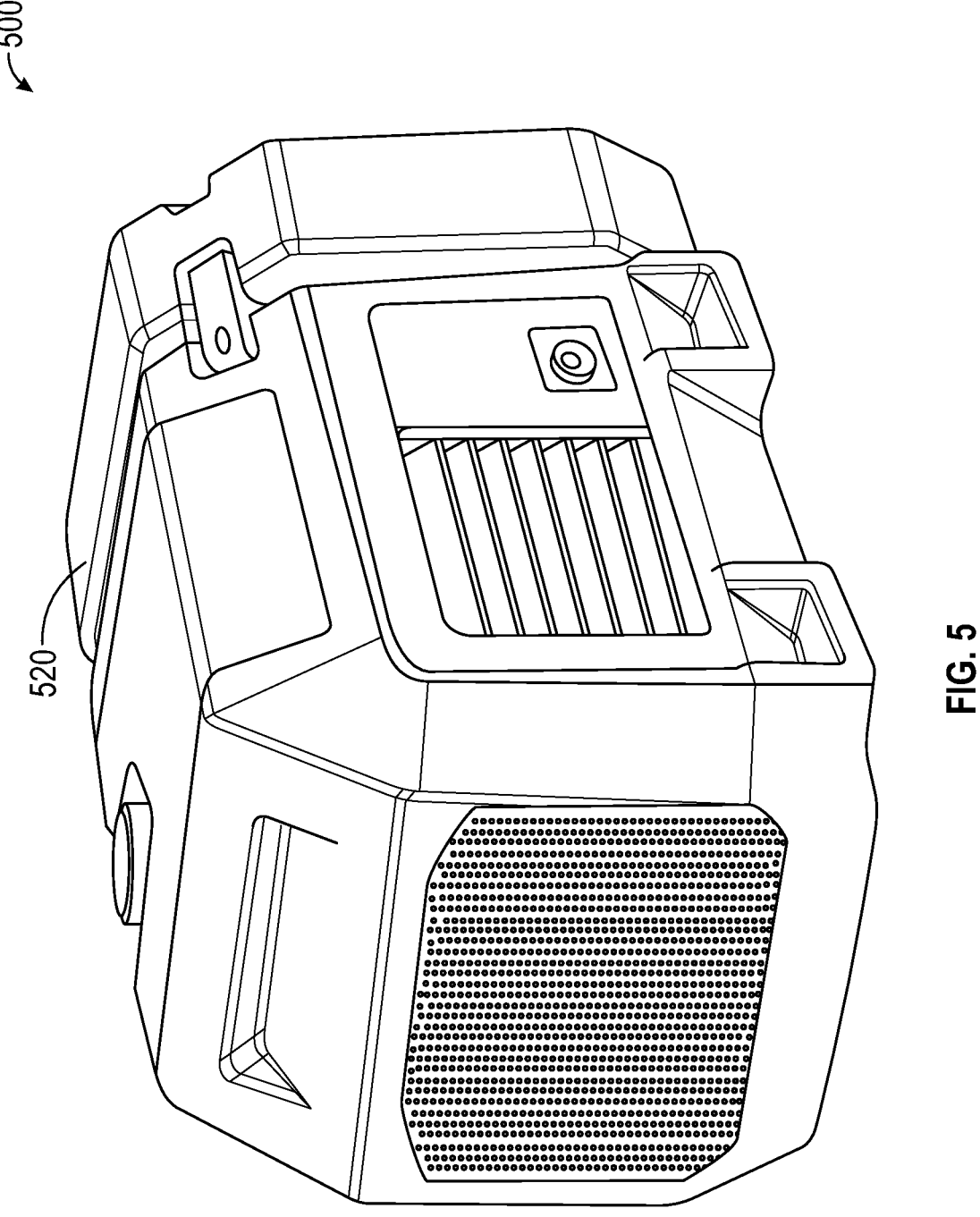
FIG. 5 is a perspective view of a hybrid power supply, according to an exemplary embodiment.
Figure 6:
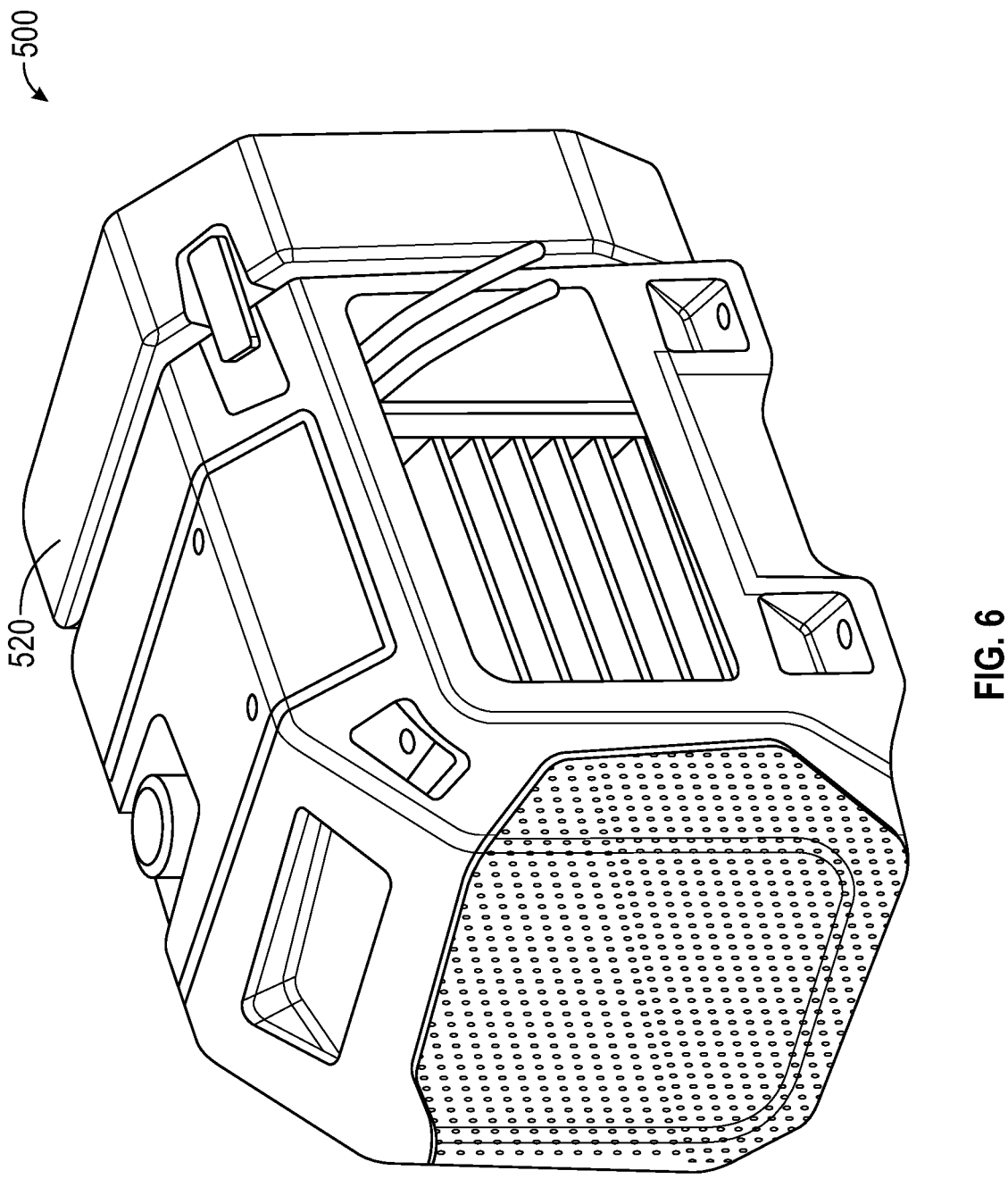
FIG. 6 is a perspective view of a hybrid power supply, according to an exemplary embodiment.
Figure 7:
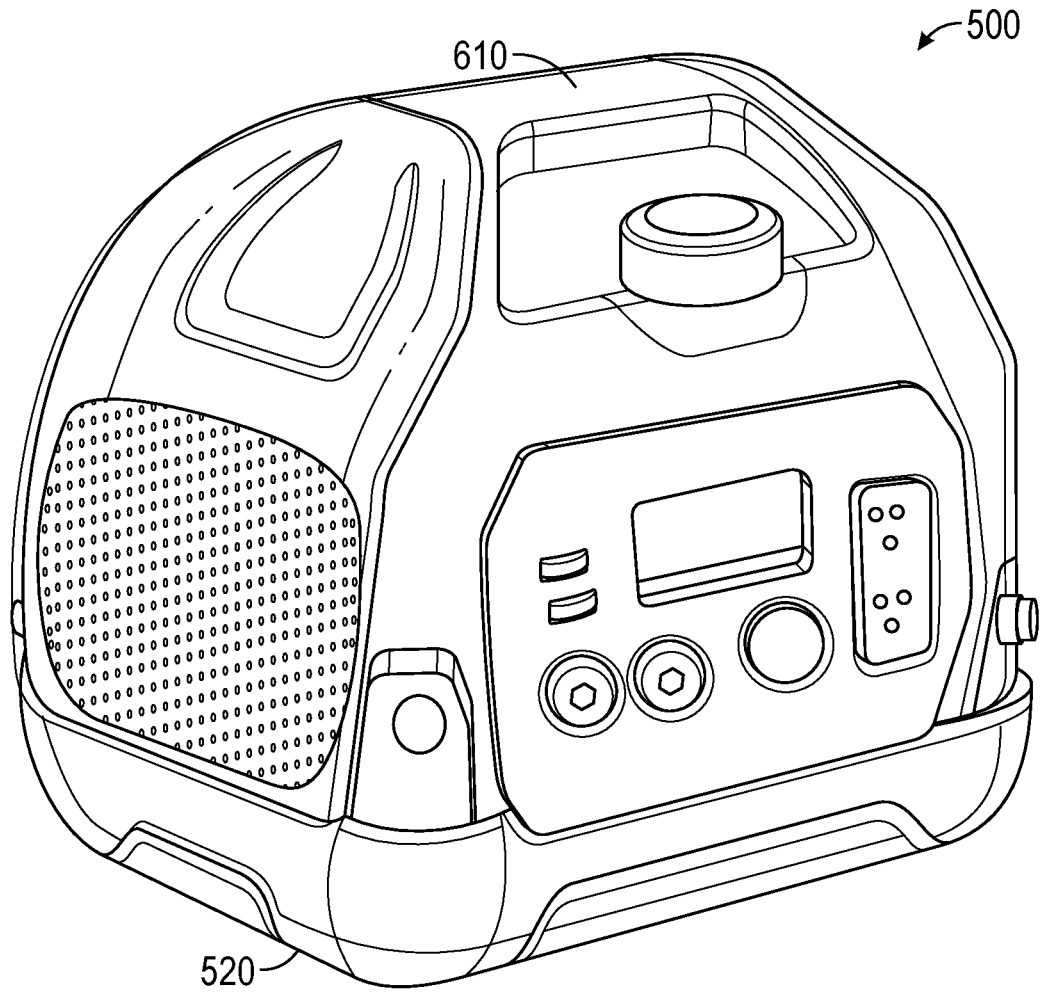
FIG. 7 is a perspective view of a hybrid power supply, according to an exemplary embodiment.

FIGS. 5-7 illustrate a hybrid power supply 500 according to exemplary embodiments. The hybrid power supply 500 may be substantially similar to power supply 200 but may include both a motor and a battery within a single housing or otherwise coupled together. Referring to FIG. 5, hybrid power supply 500 includes a long block engine 402 (e.g., an M61H long block engine, shown in FIG. 8). The hybrid power supply 500 of FIG. 5 is configured to output DC power between about 12 kilowatts and about 25 kilowatts at a nominal voltage of 72 VDC. The hybrid power supply 500 of FIG. 5 can output about 12 kilowatts continuously at about 120 degrees Fahrenheit and 25 kilowatts continuously at 104 degrees Fahrenheit. Referring to FIG. 6, the hybrid power supply 500 includes a long block engine 510 (e.g., an M38H long block engine, shown in FIGS. 9 and 19-24). The hybrid power supply 500 of FIG. 6 is configured to output DC power between about 5 kilowatts and about 9 kilowatts at a nominal voltage of 48 VDC. The hybrid power supply 500 of FIG. 6 can output about 5 kilowatts continuously at 120 degrees Fahrenheit and about 9 kilowatts continuously at 104 degrees Fahrenheit. Referring to FIG. 7, the hybrid power supply 500 includes a long block engine (e.g., an NV200H long block engine). The hybrid power supply 500 of FIG. 7 is configured to output DC power between about 1.5 kilowatts and about 3 kilowatts at a nominal voltage of 48 VDC. The hybrid power supply 500 of FIG. 7 can output about 1.5 kilowatts continuously at 120 degrees Fahrenheit and about 3 kilowatts continuously at 104 degrees Fahrenheit. The hybrid power supply 500 of FIG. 7 may include a carrying handle 610 and may be lightweight enough to be carried by one hand. The hybrid power supply 500 may be used to power outdoor power equipment as described above (e.g., as generators 210, 310 described above). In some embodiments, the hybrid power supply 500 may operate at nominal DC voltage levels between 36 VDC and 240 VDC and may be capable of supporting electric vehicle DC charging Level 1 and Level 2. In some embodiments, the nominal DC voltage level may be aligned to the power potential of the internal combustion engine so as to limit the output current levels to a maximum of 300 amp continuous.

As described above with reference to generators 210, 310, the hybrid power supply 500 includes an internal combustion engine that uses fuel (e.g., gasoline, diesel, propane, etc.) to rotate a crankshaft. The crankshaft is coupled to the rotor of an alternator, which rotates with the crankshaft relative to a stator to generate AC power. The AC power is converted to DC power by a converter, which may be integrated into a controller or may be a separate component to the controller. The DC power may be used to power motors and other electrical components or devices. The controller (e.g., CPU) may also control the flow of electricity to various electrical loads coupled to the hybrid power supply 500, may control the speed of the internal combustion engine, may receive user inputs, may control a starter motor, or may control the alternator such that the alternator acts as a starter motor as described above, may receive information for various sensors, and may provide information about the generator to a user.

The hybrid power supply 500 may include mechanical and/or electrical cooling fans (e.g., fans 508, see FIGS. 19-25). For example, a mechanical cooling fan may be coupled to and configured to rotate with the crankshaft to draw in air from outside the generator and push the air past the internal combustion engine and other components. The DC power output by the converter may also be used to power electrical cooling fans within the generator. In some embodiments, the hybrid power supply 500 relies primarily on forced convective cooling from an electrical fan to control the temperature of the generator. The electrical fan may be a "smart" fan that varies in rotation speed based on the amount of cooling required. In some embodiments, the controller is communicatively coupled to the fan and controls the rotational speed of the fan. In some embodiments, in cold start conditions, the electrical fan is not turned on to not cool the engine while it is initially running and heating up to its ordinary operating temperature. After that temperature has been achieved, the electrical fan can then be turned on for normal engine and system cooling. In some embodiments, the electrical fans may continue to operate after an engine within the hybrid power supply 500 is turned off (e.g., by receiving power from the battery) to prevent heat soaking. The electrical fans may be configured to operate for a predetermined amount of time after the engine is shutdown. The predetermined amount of time that the electrical fans run after shutdown may be based on measured temperature of the generator or load required to run the fans. The hybrid power supply 500 may include an air intake system and an exhaust system coupled to the internal combustion engine. The internal combustion engine takes in air via the air intake system, mixes the air with fuel, burns the air/fuel in a cylinder to drive the piston and rotate the crankshaft, then exhausts the burned fuel-air mixture via the exhaust system. The exhaust system may include an integrated muffler. The muffler may be catalyst-ready.

The hybrid power supply 500 may include electrical power and data connections (e.g., terminals) to distribute power to and communicate with connected electrical devices or components of outdoor power equipment or vehicles. The electrical power and data connections may be sized and positioned similarly to a DC battery of similar power output, such that an existing battery can be removed from a piece of equipment and easily replaced by the hybrid power supply 500. In some embodiments, the generator requires only a data terminal and positive and negative power terminals to communicate with and supply power to the outdoor power equipment or vehicle, similar to a DC battery. The hybrid power supply 500 may include electrical wiring and wire harnessing, for example to electrically and communicatively couple the alternator to the controller and the controller to the electrical power and data terminals. The hybrid power supply 500 may include a support structure and inner housing to hold the various other components in place and protect them from environmental hazards.

The hybrid power supply 500 may include several optional subsystems that can be removed or excluded from the generator if not required. For example, the hybrid power supply 500 may optionally include a fuel tank. However, when the hybrid power supply 500 is integrated into outdoor power equipment or vehicle that already includes a fuel tank, the generator may not include a fuel tank and may instead include a fuel connection configured to be fluidly coupled to the existing fuel tank. The hybrid power supply 500 may include an integrated battery 520 or may be configured to interface with an existing battery of the outdoor power equipment or vehicle. The integrated batteries may function similarly to battery 320 as described above. The hybrid power supply 500 may include an external housing to reduce noise and protect the components from environmental hazards. In some embodiments, the external housing may be excluded, for example, when the outdoor power equipment or vehicle includes its own power supply housing. For example, in FIGS. 2-4, the ZTR mower 10 includes a power supply housing 50 that includes a cover 51 configured to rotate about a hinge 52 to open and close the housing 50. A gas spring 53 may be incorporated to hold the cover 51 open when a user accesses the power supply. If an AC power supply is required (e.g., to supply power to an AC power outlet integrated into the outdoor power equipment or vehicle), the hybrid power supply 500 may include an inverter configured to convert the DC power to clean AC power as described above. The inverter may be integrated into the controller or may be a separate component. The hybrid power supply 500 may include a user interface or may be configured to communicate with an existing user interface of the outdoor power equipment or vehicle.

When components are already included in the outdoor power equipment or vehicle (e.g., a fuel tank, a battery, etc.), the hybrid power supply 500 may include interface points configured to allow the generator to easily integrate with the existing components. For example, when the outdoor power equipment or vehicle includes a fuel tank, the hybrid power supply 500 may include a fuel inlet port configured to integrate with the existing fuel tank. When the outdoor power equipment or vehicle includes a battery, the hybrid power supply 500 may include power and data terminals configured to interface with the power and data terminals of the battery. For example, the power and data terminals of the hybrid power supply 500 may be positioned such that the generator can be installed into the outdoor power equipment or vehicle and be electrically and communicatively coupled to the battery without additional wiring. Similarly, when the outdoor power equipment or vehicle includes an AC power outlet, the hybrid power supply 500 may include an inverter and AC power terminals configured to easily couple to the AC power outlet to supply power to the outlet. When components are supplied on the outdoor power equipment or vehicle, the hybrid power supply 500 may include only the core features (e.g., the engine, alternator, controller, support structure and housing, and electrical connections), allowing the generator to be more compactly designed where optional components are not required.

The controller of the hybrid power supply 500 may be configured to communicate with other controllers and/or CPUs of the outdoor power equipment or vehicle, for example via one or more data terminals. The data terminals of the hybrid power supply 500 may electrically couple with terminals of the outdoor power equipment or vehicle. The controller uses smart communication protocols like CAN J1939 to communicate with, receive commands from and/or send commands to the controllers or CPUs of the outdoor power equipment or vehicle. The controller may be configured to detect communication protocols and the communication rate from the controllers or CPUs of the outdoor power equipment or vehicle. The controller can convert or translate the communication protocol to various other protocols to allow integration with a wide range of battery applications and manufacturers. The hybrid power supply 500 may include integrated automatic or user-selectable operational modes to enable the generator to interface with and recharge batteries that do not include integrated CPUs or controllers.

The hybrid power supply 500 may include a user interface that allows a user to control the operation of the generator and select various operational modes. For example, the user may control the on/off condition of the hybrid power supply 500. The user may control the load response of the hybrid power supply 500. For example, the user may select the speed at which the hybrid power supply 500 responds to changes in load. A slower load response may allow the hybrid power supply 500 to operate at a more steady speed without reacting to brief load surges, while a faster load response allows the hybrid power supply 500 to quickly respond to changes in load. The user may select an operational mode to control the noise level of the hybrid power supply 500. For example, the user may select a performance mode in which the generator supplies a higher level of power and produces more noise, or the user may select a quiet mode in which the generator supplies a more limited amount of power but produces less noise. A user may also select an eco-mode that optimizes fuel economy and minimizes exhaust gas emissions. Alternatively, or additionally, a user may set a maximum power output level that is below the maximum rated power level of the hybrid power supply 500, in order to conserve fuel or reduce noise.

FIGS. 19-24 are respectively perspective, front, left side, right side, rear, and top views showing the arrangement of the components of the hybrid power supply 500. The hybrid power supply 500 includes an inner housing 502. A fuel tank 504 and a battery 506 may be mounted to the outside of the housing 502. Two electric fans 508 are mounted the inside of the housing 502 to provide convective cooling. The housing 502 also contains an internal combustion engine 510 coupled to an alternator 512 (e.g., a generator, an integrated starter generator). Air is drawn into the internal combustion engine 510 though an air purifier 513, while fuel from the fuel tank 504 is injected by an electronic fuel injector. The exhaust from the internal combustion engine 510 is directed into a muffler 514 and then out of the housing 502 via the muffler exhaust ports 516. The controller 518 converts the AC power from the alternator 512 to DC power using a converter (e.g., a rectifier). In some embodiments, the controller may also include an inverter to convert the DC power to stable AC power. The DC power is routed from the controller 518 to the terminals 520, which interface with corresponding terminals on a vehicle, outdoor power equipment, a docking station, etc. The hybrid power supply 500 includes a display screen 522 (e.g., a touchscreen, a user interface, etc.) mounted the outside of the housing 502 that a user may use to select the operational mode of and otherwise control the hybrid power supply 500. The hybrid power supply 500 includes an emergency stop button 524 mounted to the outside of the housing 502.

Figure 25:
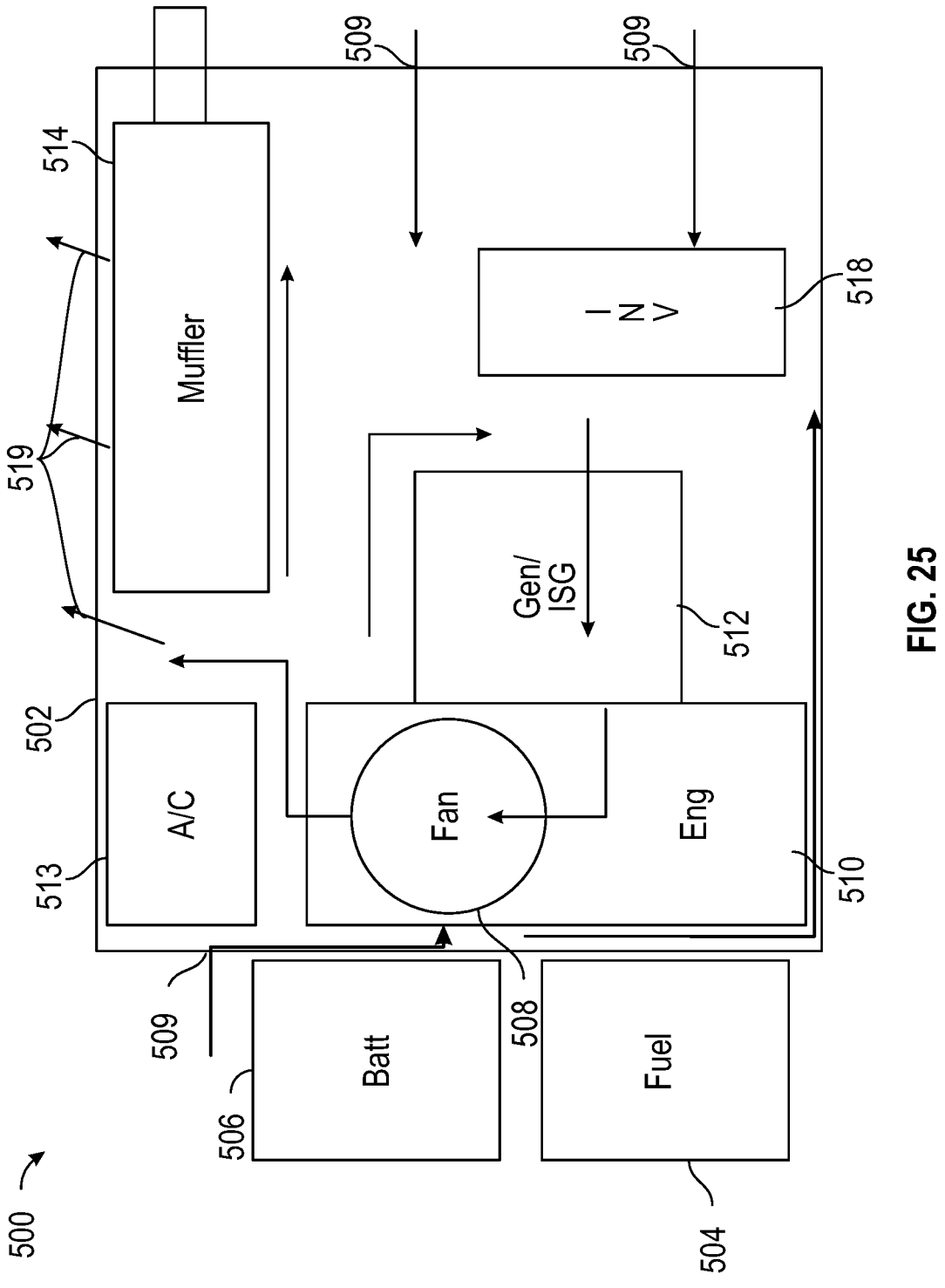
FIG. 25 is a schematic view of a hybrid power supply, according to an exemplary embodiment.

FIG. 25 is a schematic view of an embodiment of the hybrid power supply 500 with arrows depicting the airflow though the housing 502. A fan 508 draws in air from the inlet vents 509. The air passes by the controller 518 and is drawn through the integrated starter generator 512 and past the internal combustion engine 510 into the fan 508. The air is output from the fan 508 past an air purifier 513 and the muffler 514 and out of the housing 502 via the exhaust vents 519. A battery 506 and fuel tank 504 may be mounted to the outside of the housing 502.

In some embodiments, the user may input information about the task to be completed using outdoor power equipment. Referring again to the hybrid power supply 200 in FIG. 3, the controller may determine when and if to activate the generator 210 to charge the battery 215 based on the entered information. For example, if a user desires to cut a lawn using ZTR mower 10, a user can input an estimated cutting time or an estimated area of grass to be cut. The user may also enter the length of the grass (e.g., long, medium, short, etc.) and/or the condition of the grass (e.g., wet, dry, thick, thin). The controller can calculate the amount of energy required to complete the task. For example, cutting a given area of wet, tall grass will require more energy than cutting the same area of dry, short grass. The controller can determine whether the generator will have to charge the battery 215 in order to complete the task. For example, if the controller determines that the battery 215 does not have enough charge to complete the task, the controller may activate the generator 210 to charge the battery 215 when the battery charge falls below a predetermined level (e.g., 10 percent charge, 20 percent charge, etc.). If the controller determines that the battery has enough charge to complete the task, the controller may not activate the generator 210, even if the battery falls below the predetermined level. Once the task is complete, the outdoor power equipment can be charged via grid power without the need to activate the generator 210 and burn fuel. In some embodiments, controller may also adjust the predetermined level based on the load on the battery 215. For example, if the battery is experiencing a high load (e.g., cutting tall, wet grass) and discharging more rapidly the controller may activate the generator 210 when the remaining battery charge is a higher level than if the battery 215 were experiencing a lower load (e.g., cutting short, dry grass). In some embodiments, the controller may activate the generator 210 even before the battery charge falls below a predetermined level in order to charge the battery 215 to a charge level that is sufficient to complete the task. For example, if the controller determines that the battery 215 can be charged more efficiently closer to the beginning of the task (e.g., due to temperature differences in the battery over the course of the task), the controller may activate the generator 210 and charge the battery 215 to a full charge at a point in the task that the task can be completed using a fully charged battery. The hybrid power supply 500 may be operated in substantially the same way as the power supply 200.

Exemplary Implementations

Figure 8:
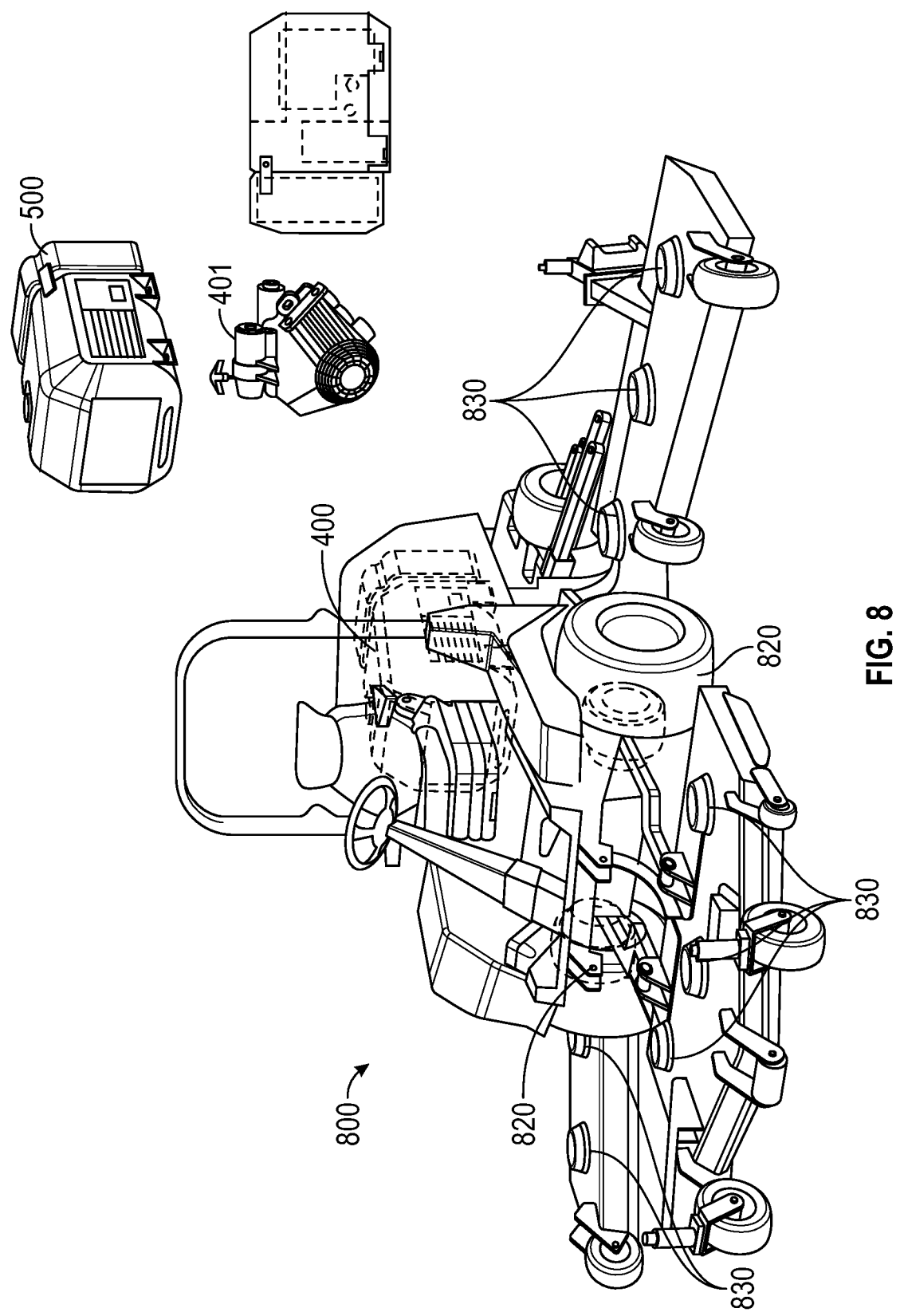
FIG. 8 is a perspective view of outdoor power equipment incorporating the hybrid power supply of FIG. 5.
Figure 9:
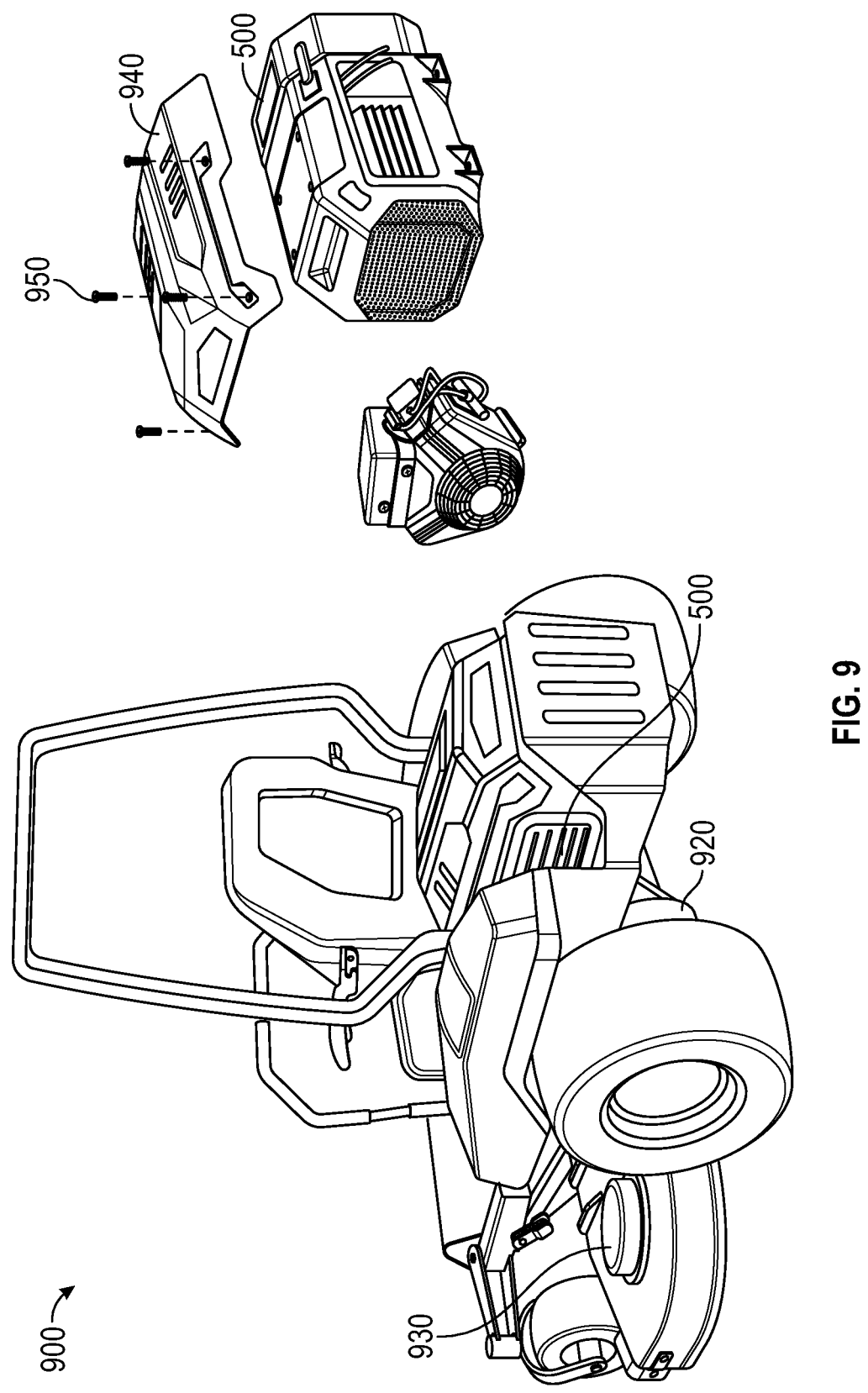
FIG. 9 is a perspective view of outdoor power equipment incorporating the hybrid power supply of FIG. 6.
Figure 10:
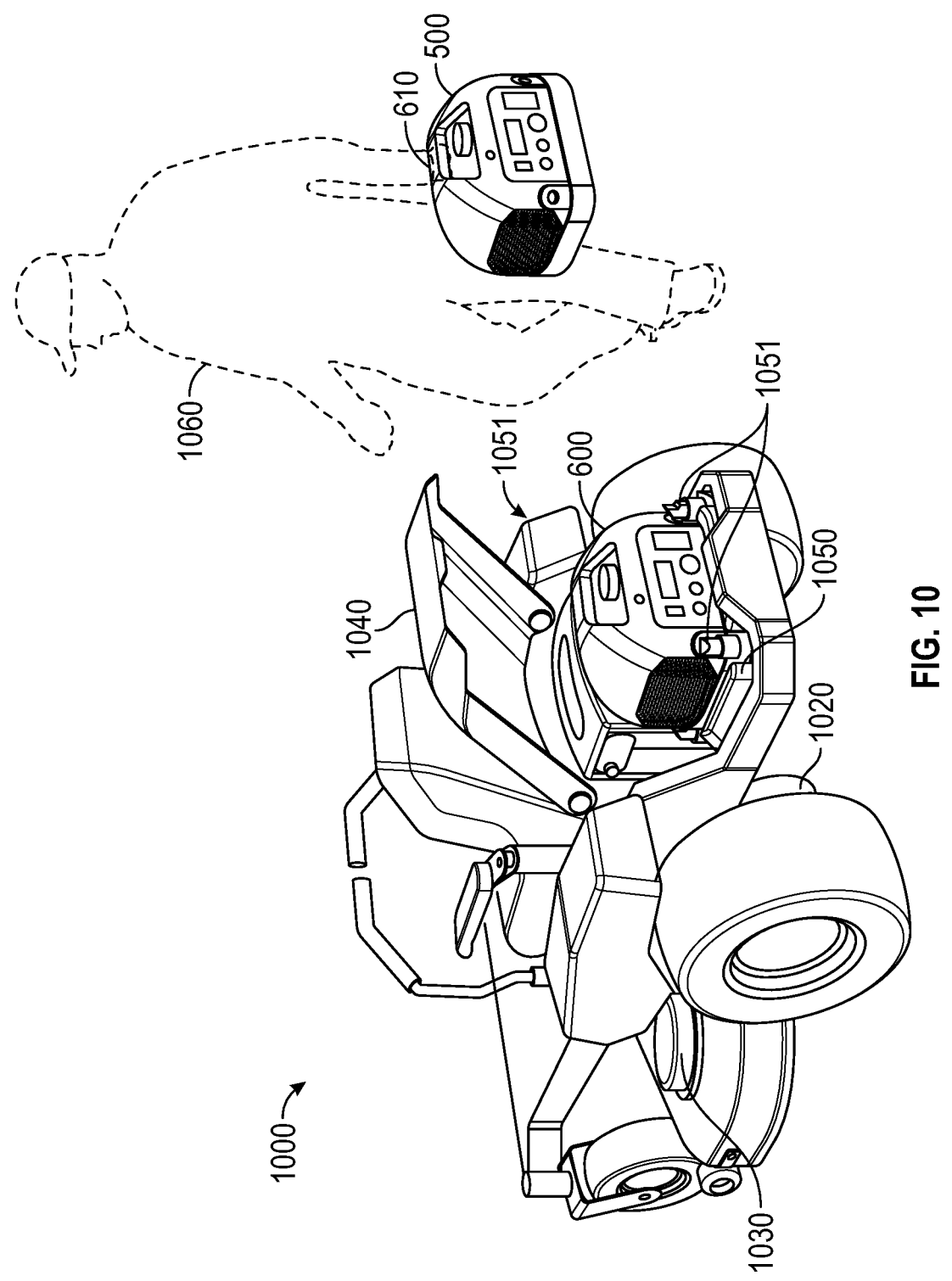
FIG. 10 is a perspective view of outdoor power equipment incorporating the hybrid power supply of FIG. 7.

As discussed above, the hybrid power supply 500 may be used to power outdoor power equipment. FIGS. 8, 9 and 10 show various embodiments of a ZTR mower 800, 900, 1000 powered by the hybrid power supply 500, according to exemplary embodiments. The ZTR mower 800 is a wide area mower with drive motors 820 and a large number of chore motors 830 to spin additional cutting blades. The hybrid power supply 500 of FIG. 5, which has a relatively high power output, may be used for ZTR mower 800. ZTR mower 900 is a medium-size mower incorporating the hybrid power supply 500 of FIG. 6, which may be secured by a cover 940 and a plurality of fasteners 950. The hybrid power supply 500 supplies power to the drive motors 920 and the chore motors 930. ZTR mower 1000 is a smaller mower incorporating the hybrid power supply 500 of FIG. 7, which may be removable for use in for other applications. A user 1060 may lift and carry the hybrid power supply 500 of FIG. 7 by the handle 610 and can removably install the hybrid power supply 500 into a docking station 1050 in a compartment 1052. The user can then fasten the hybrid power supply 500 to the docking station 1050 using hooks 1051 without the use of tools and can close hingedly coupled cover 1040. The hybrid power supply 500 supplies power to the drive motors 1020 and the chore motors 1030.

Figure 11:
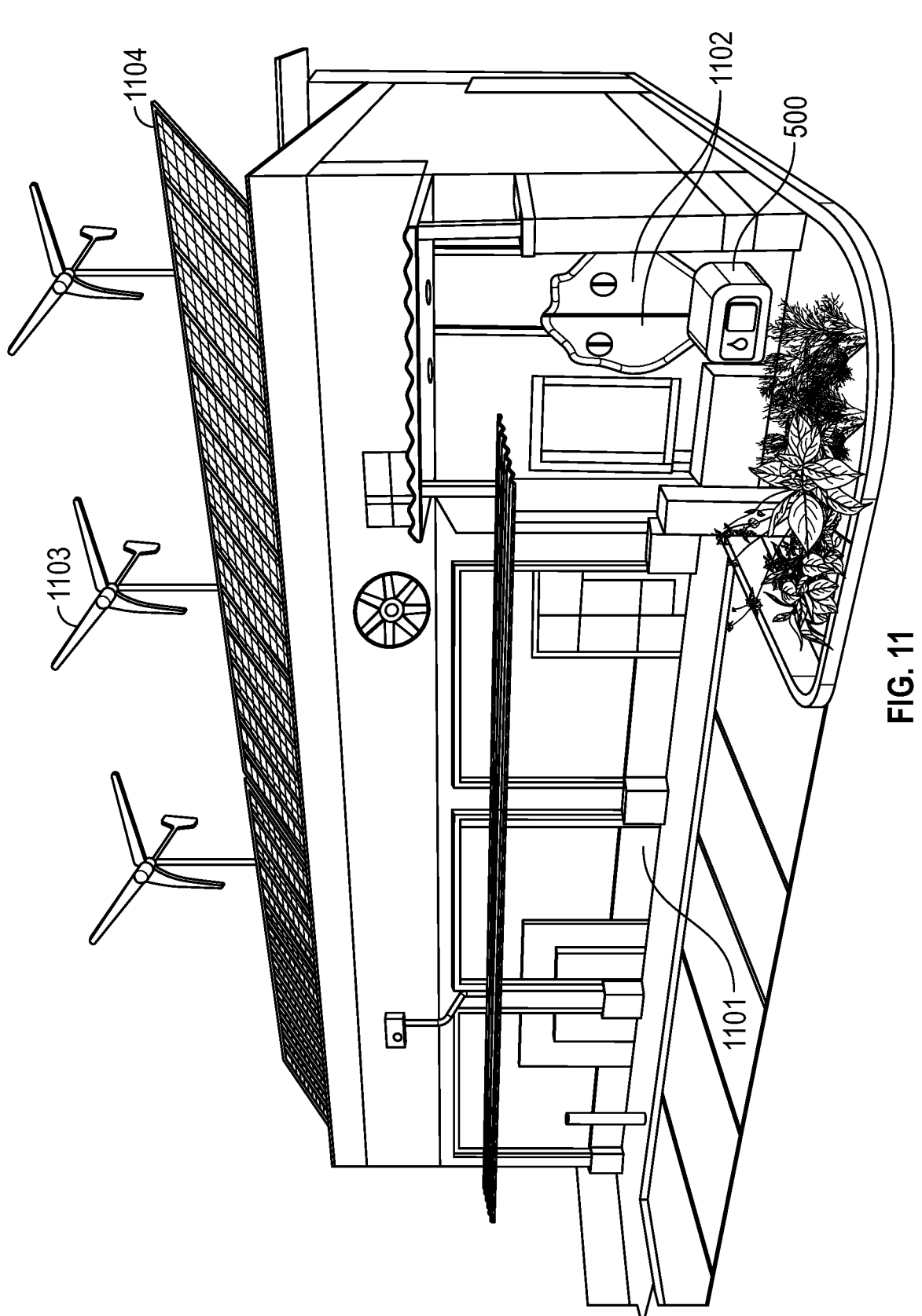
FIG. 11 is a perspective view of a building incorporating the hybrid power supply of FIG. 5.
Figure 12:
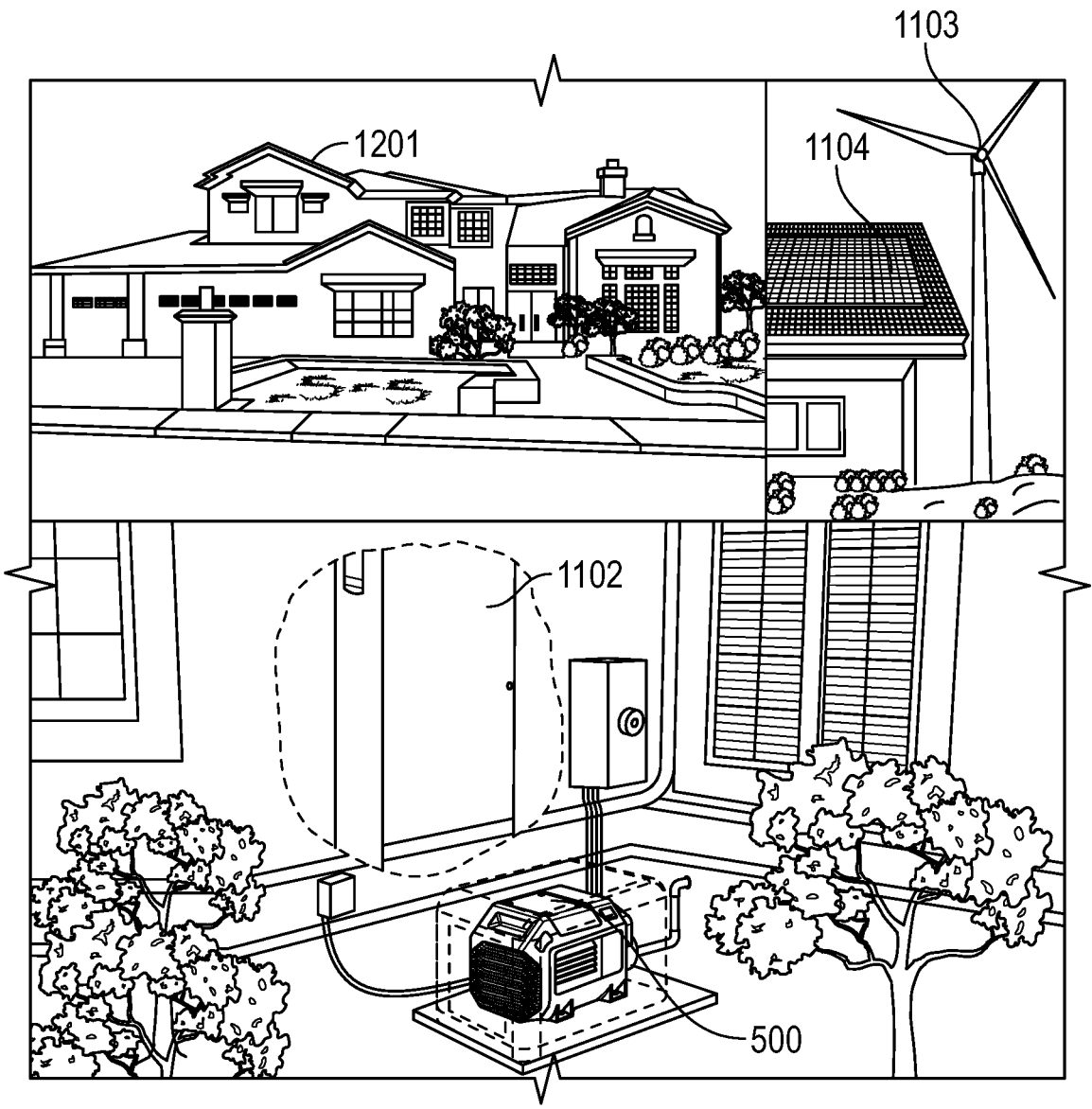
FIG. 12 is a perspective view of a building incorporating the hybrid power supply of FIG. 6.
Figure 13:
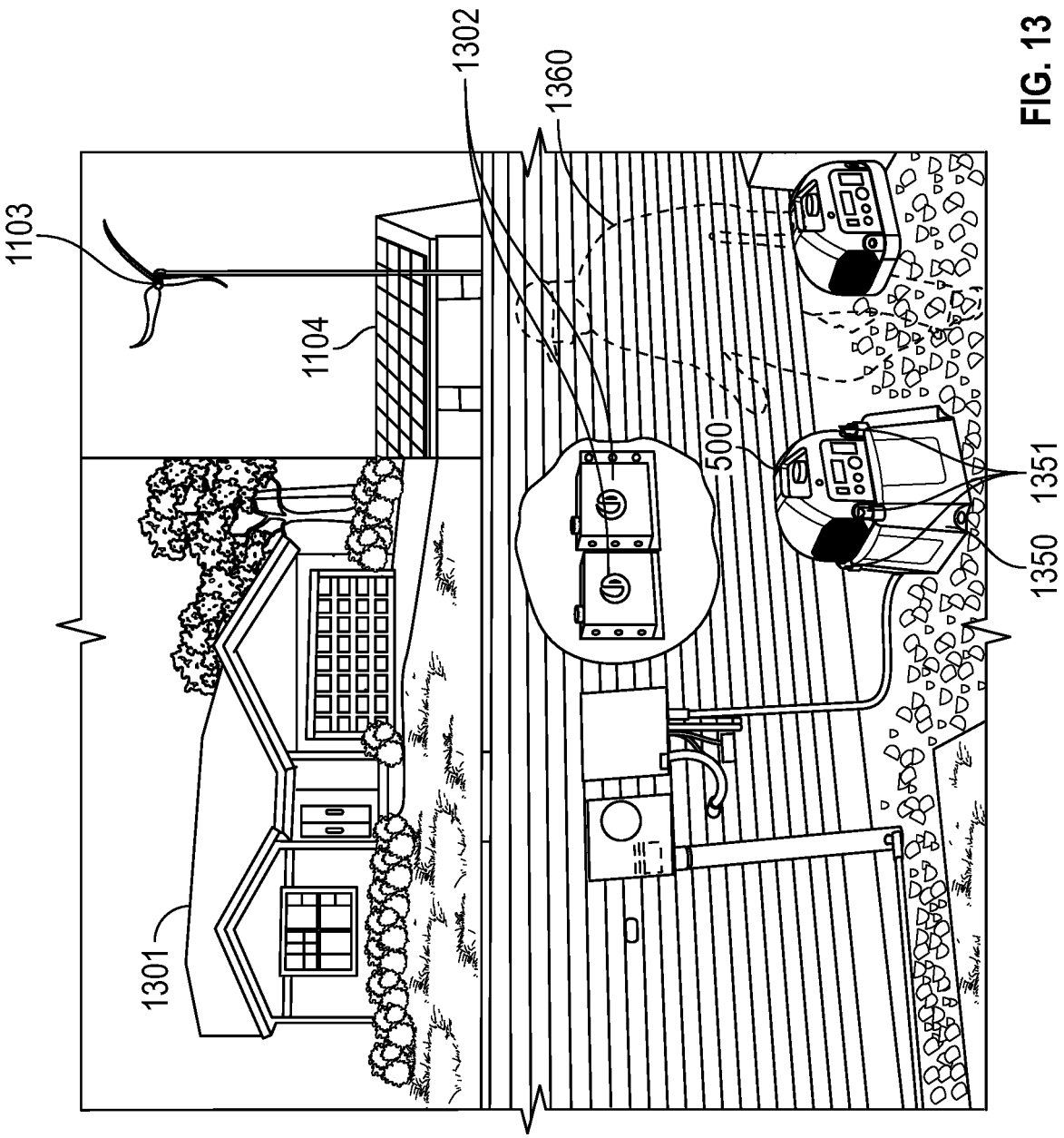
FIG. 13 is a perspective view of a building incorporating the hybrid power supply of FIG. 7.

As shown in FIGS. 11-13, the hybrid power supply 500 may also be used to supply power to a home 1201, 1301 or business 1101 of varying size and electrical demand. The hybrid power supply 500 may supply power directly to loads within the home 1201, 1301 or business 1101, or may be used to charge one or more home batteries 1102, 1302. This may be particularly useful when the home or business already has home batteries configured to be charged by wind turbines 1103 or solar panels 1104. The hybrid power supply 500 may supplement the electricity generated by the wind turbines 1103 or solar panels 1104 in times of low wind or sun, particularly when grid power is more expensive than power generated by the hybrid power supply 500 or when grid power is unavailable (e.g., during a blackout). A docking station 1350 may be electrically coupled to the home batteries 1302 and configured to receive a portable hybrid power supply 500 that may not include its own battery. The hybrid power supply 500 may be installed into the docking station 1350 by a user 1360 and held in place by hooks 1351 (e.g., buckles, snaps, etc.) that fasten the hybrid power supply 600 to the docking station 1350 without the use of tools. When the hybrid power supply 500 is needed for other applications, the hooks 1351 can be removed by hand and the hybrid power supply 500 can be carried away by the user 1360 using the handle 610. The same generator may be removably installable into the docking station 1350 for home use and the docking station 1050 on the ZTR mower 1000.

Figure 14:
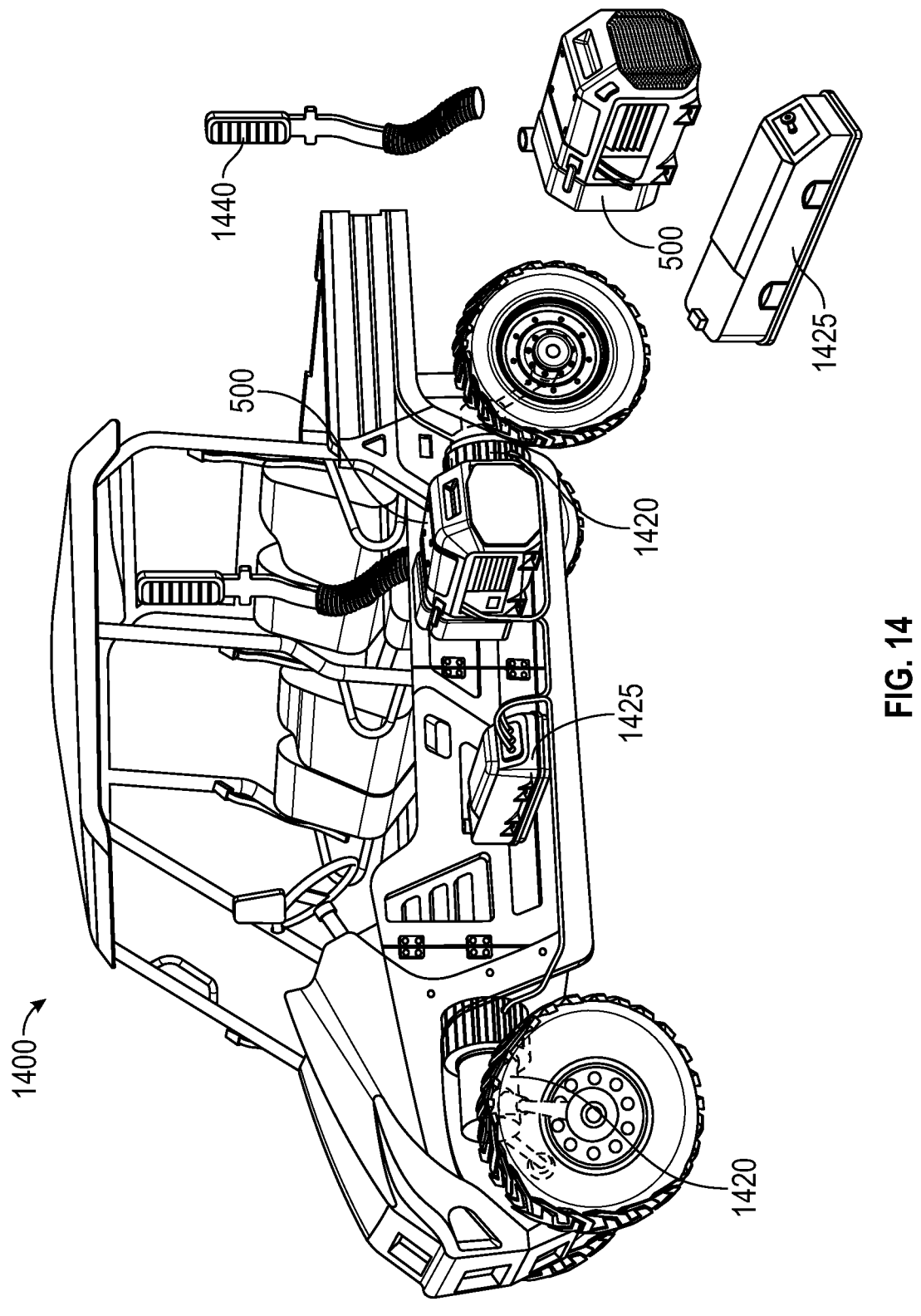
FIG. 14 is a perspective view of a utility vehicle incorporating the hybrid power supply of FIG. 6.
Figure 15:
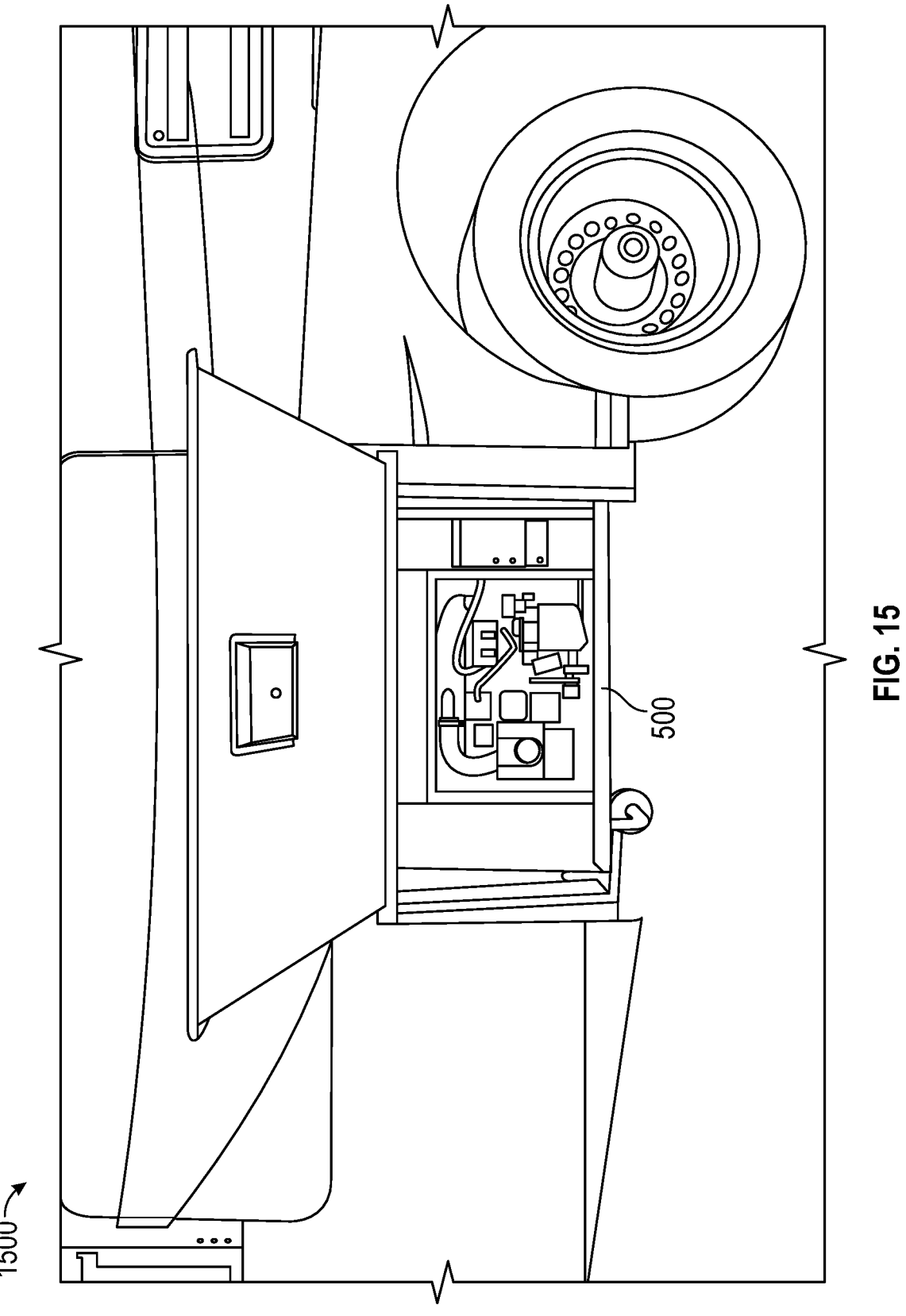
FIG. 15 is a view of a recreational vehicle incorporating a hybrid power supply, according to an exemplary embodiment.
Figure 16:
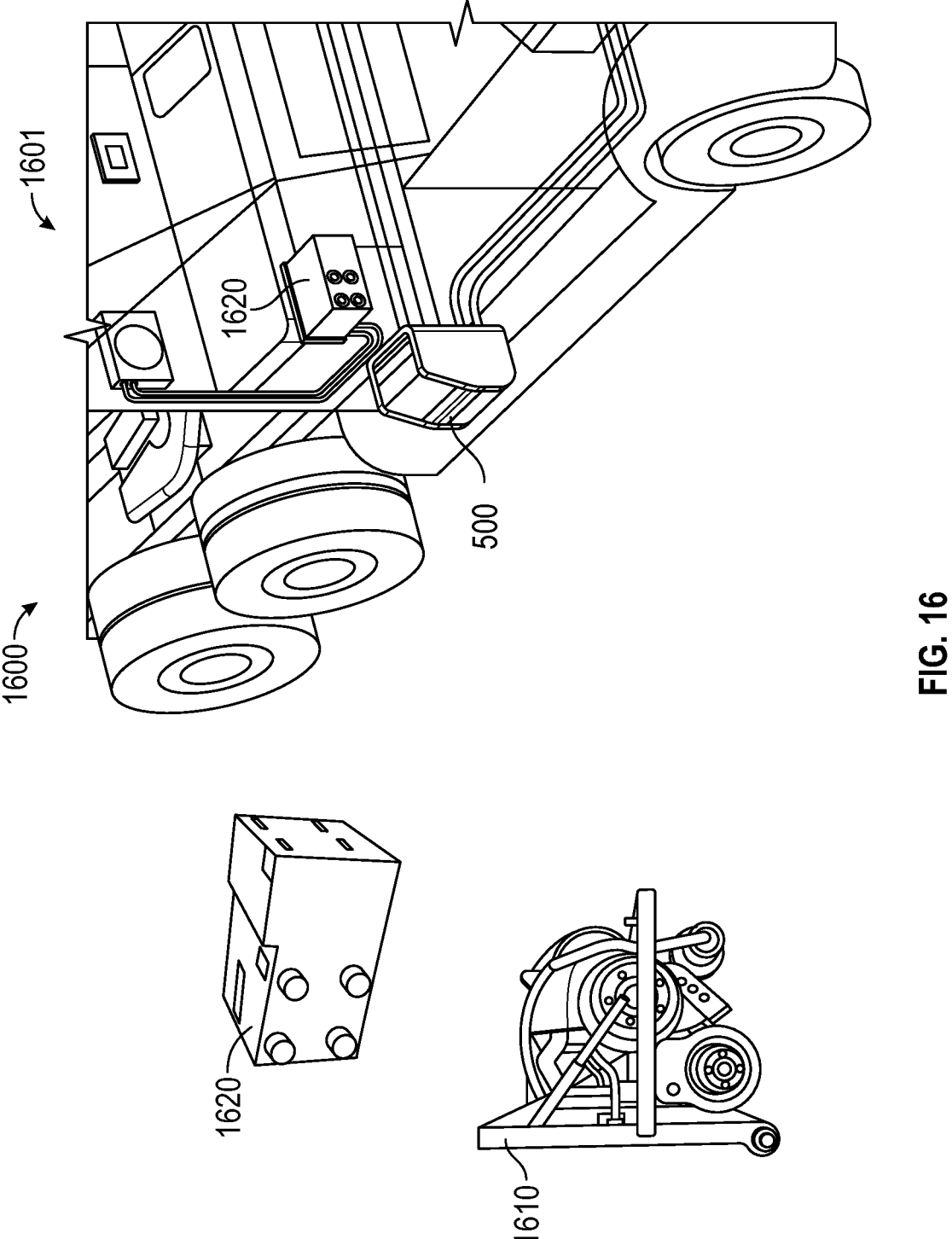
FIG. 16 is a perspective view of a tractor unit incorporating a hybrid power supply, according to an exemplary embodiment.

As shown in FIGS. 14-16, the hybrid power supply 500 may also be used to supply power to on/off highway vehicles (e.g., utility vehicles, recreational vehicles, tractor units etc.). Referring to FIG. 14, a utility vehicle 1400 is shown, according to an exemplary embodiment. Utility vehicle 1400 includes front and rear drive motors 1420 electrically coupled to a battery pack 1425. A hybrid power supply 500 that does may include its own battery pack may be installed into the utility vehicle 1400 and may supply power directly to the drive motors 1420 and/or may supply power to the battery 1425. The hybrid power supply 500 and battery 1425 may operate similarly to the hybrid power supply 500 that includes an integrated battery, as described above, including absorbing regenerative energy from the drive motors 1420. The hybrid power supply 500 may be retrofit into an existing utility vehicle 1400 to supplement an existing battery to provide additional range. The utility vehicle 1400 may include a tailpipe 1440 coupled to the hybrid power supply 500 for releasing exhaust gases.

Referring to FIG. 15, a recreational vehicle 1500 is shown with a hybrid power supply 500, according to an exemplary embodiment. The hybrid power supply 500 is configured to supply power to electrical components in a living area of the recreational vehicle 1500. For example, the hybrid power supply 500 may power an air conditioner, an electric stove, lights, etc. The hybrid power supply 500 may include an inverter to convert the DC power to stable AC power, which can be supplied to AC power outlets in the living area or outside the recreational vehicle 1500.

Referring to FIG. 16, a tractor unit 1600 (e.g., a tractor of a tractor-trailer) is shown with a hybrid power supply 500, according to an exemplary embodiment. The hybrid power supply 500 is configured to supply power to electrical components in a sleeping area 1601 of the tractor unit 1600. The tractor unit 1600 may include an electric heater/blower unit 1620 that is powered by the hybrid power supply 500 to supply heat to the sleeping area 1601. The hybrid power supply 500 may have a separate fuel tank or may be fluidly coupled to and receive fuel from the fuel tank of the tractor unit 1600.

Figure 17:
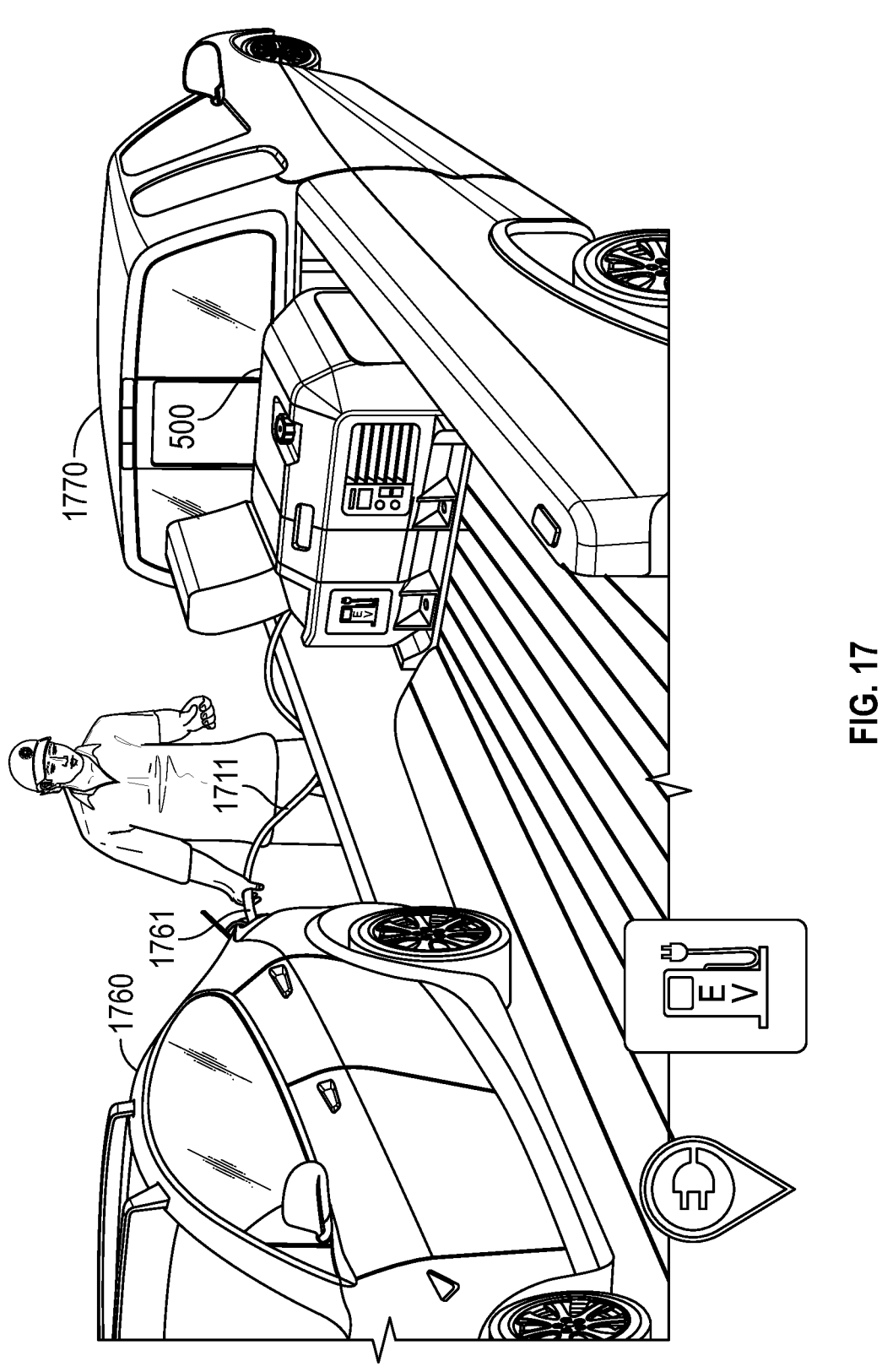
FIG. 17 is a perspective view of a hybrid power supply being used to charge electric vehicles, according to an exemplary embodiment.

Referring now to FIG. 17, according to an exemplary embodiment, a hybrid power supply 500 may be used to charge electric vehicles 1760. For example, the hybrid power supply 500 may be transported by a roadside assistance vehicle 1770 to electric vehicles that have run out of battery charge. The hybrid power supply 500 may include a charging cable 1711 configured to plug into the charging port 1761 of the electric vehicle 1760.

Figure 18:
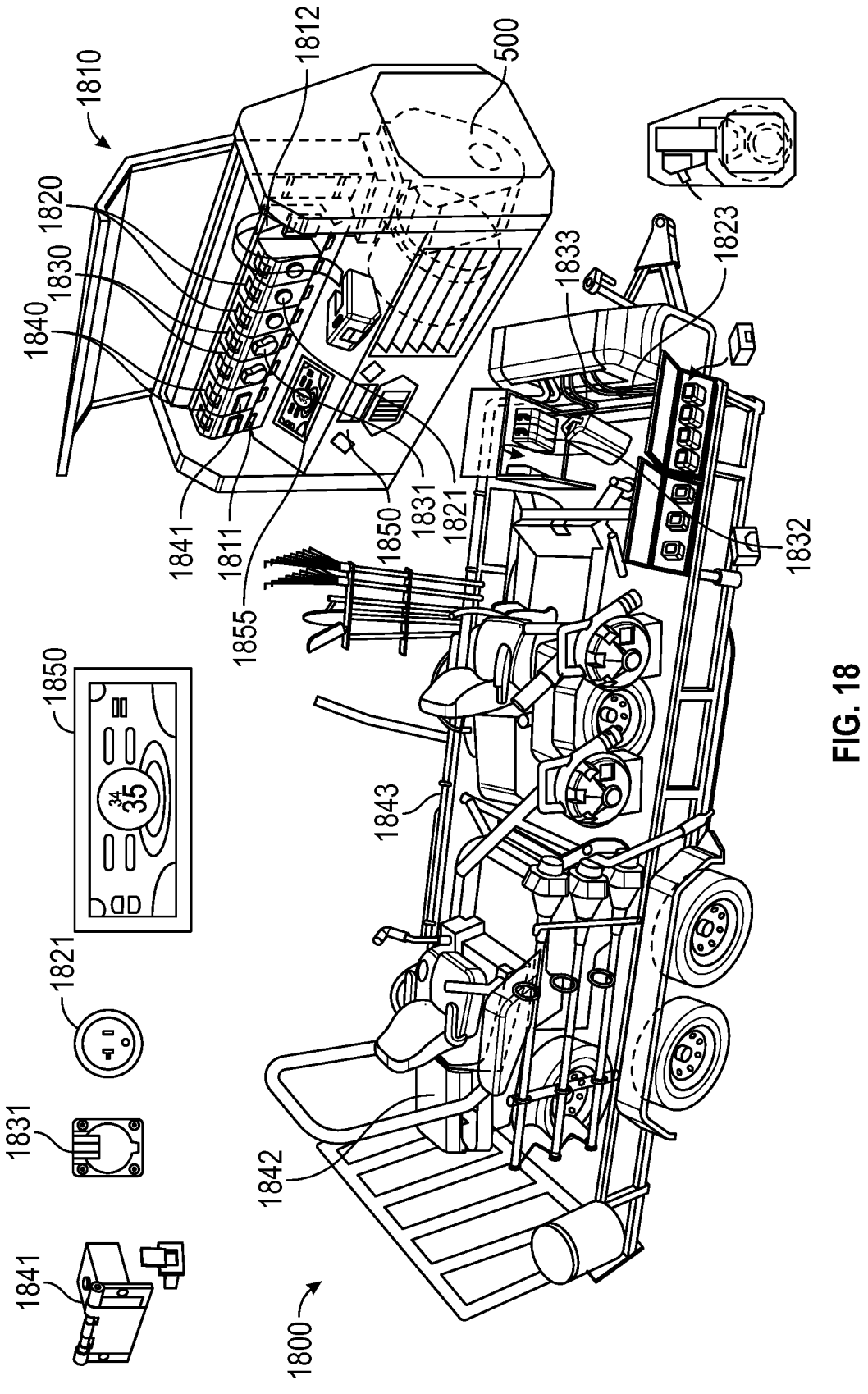
FIG. 18 is a perspective view of a charging trailer, according to an exemplary embodiment.
Figure 19:
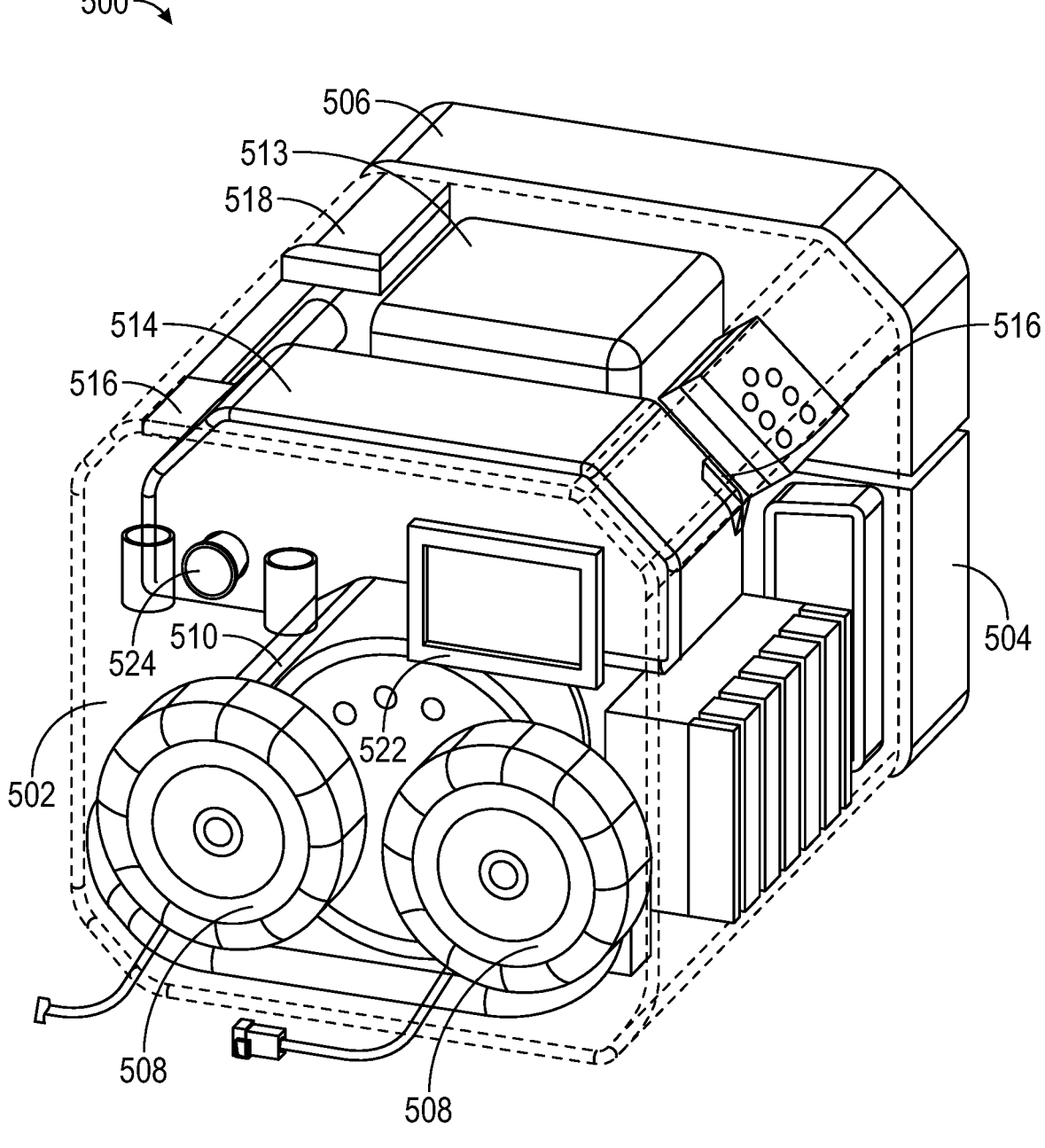
FIG. 19 is a perspective view of the hybrid power supply of FIG. 6.
Figure 20:
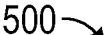
FIG. 20 is a front view of the hybrid power supply of FIG. 6.
Figure 20:
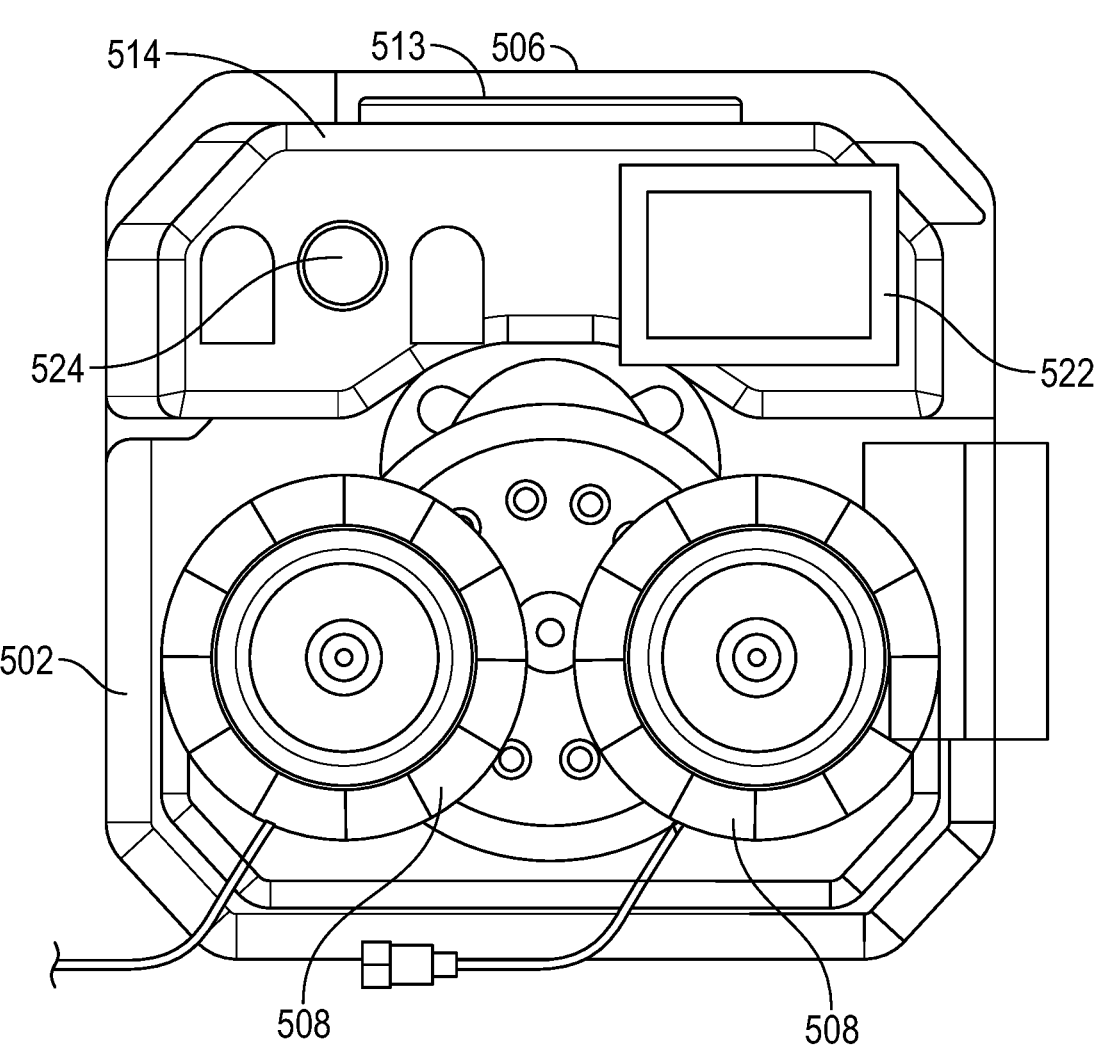
Figure 21:
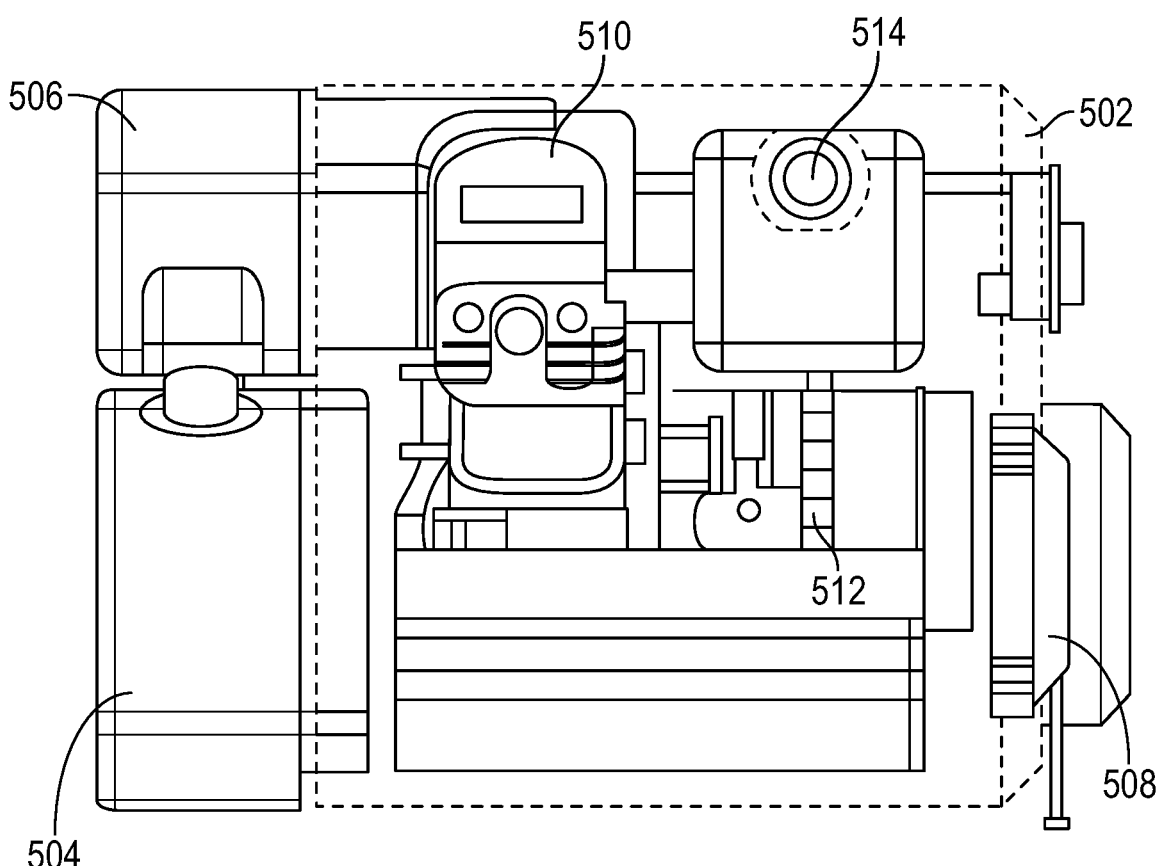
FIG. 21 is a left side view of the hybrid power supply of FIG. 6.
Figure 22:
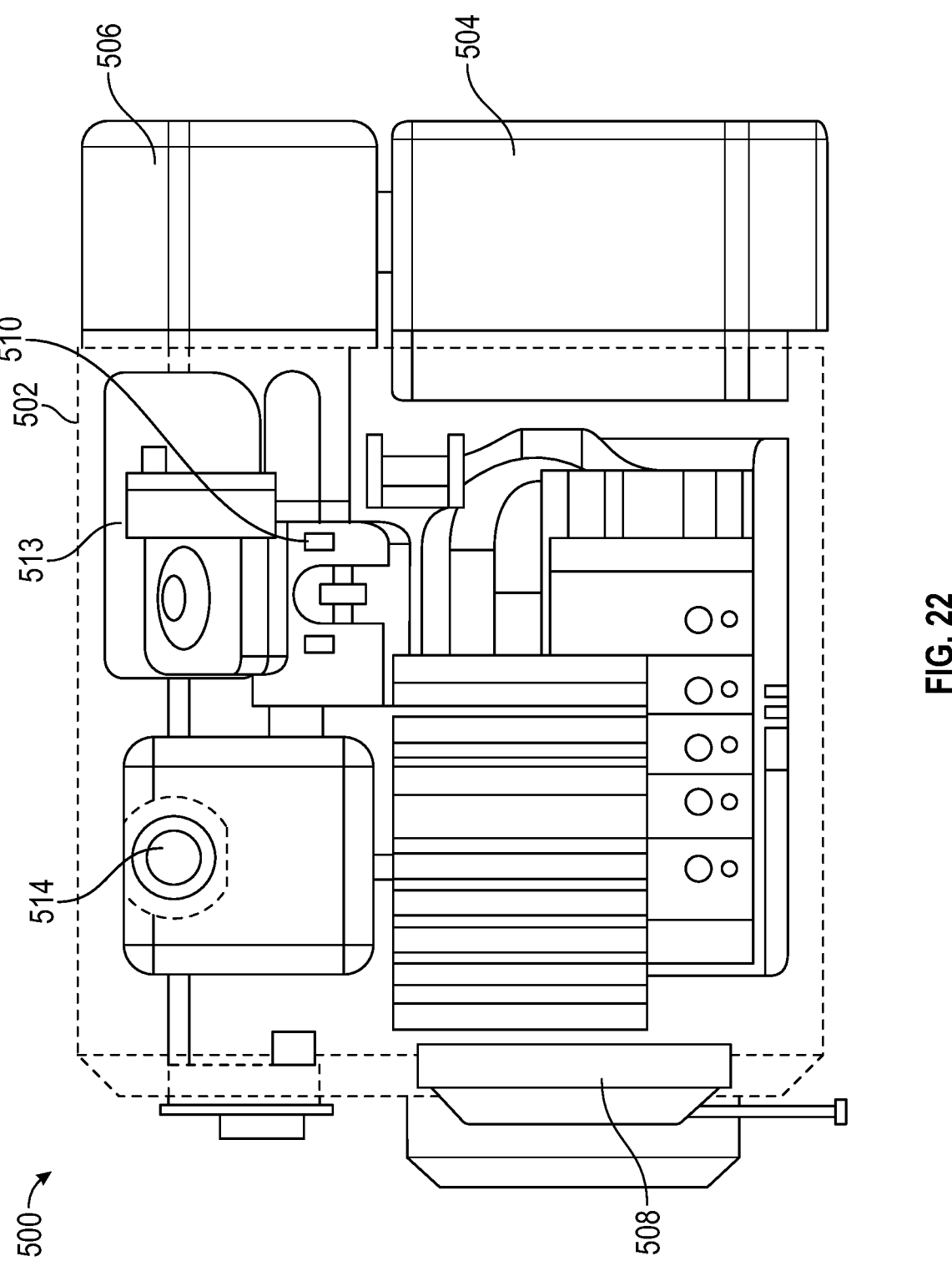
FIG. 22 is a right side view of the hybrid power supply of FIG. 6.
Figure 23:
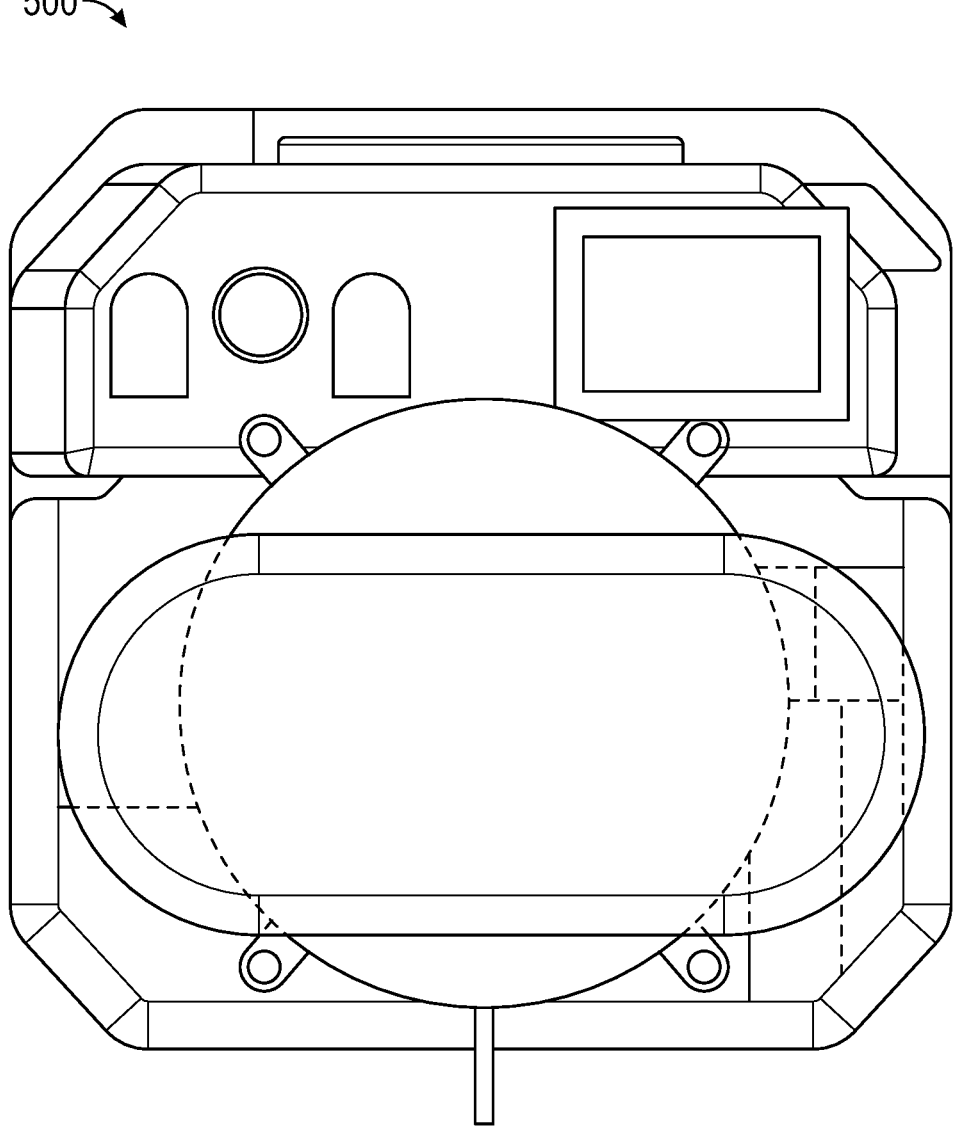
FIG. 23 is a rear view of the hybrid power supply of FIG. 6.
Figure 24:
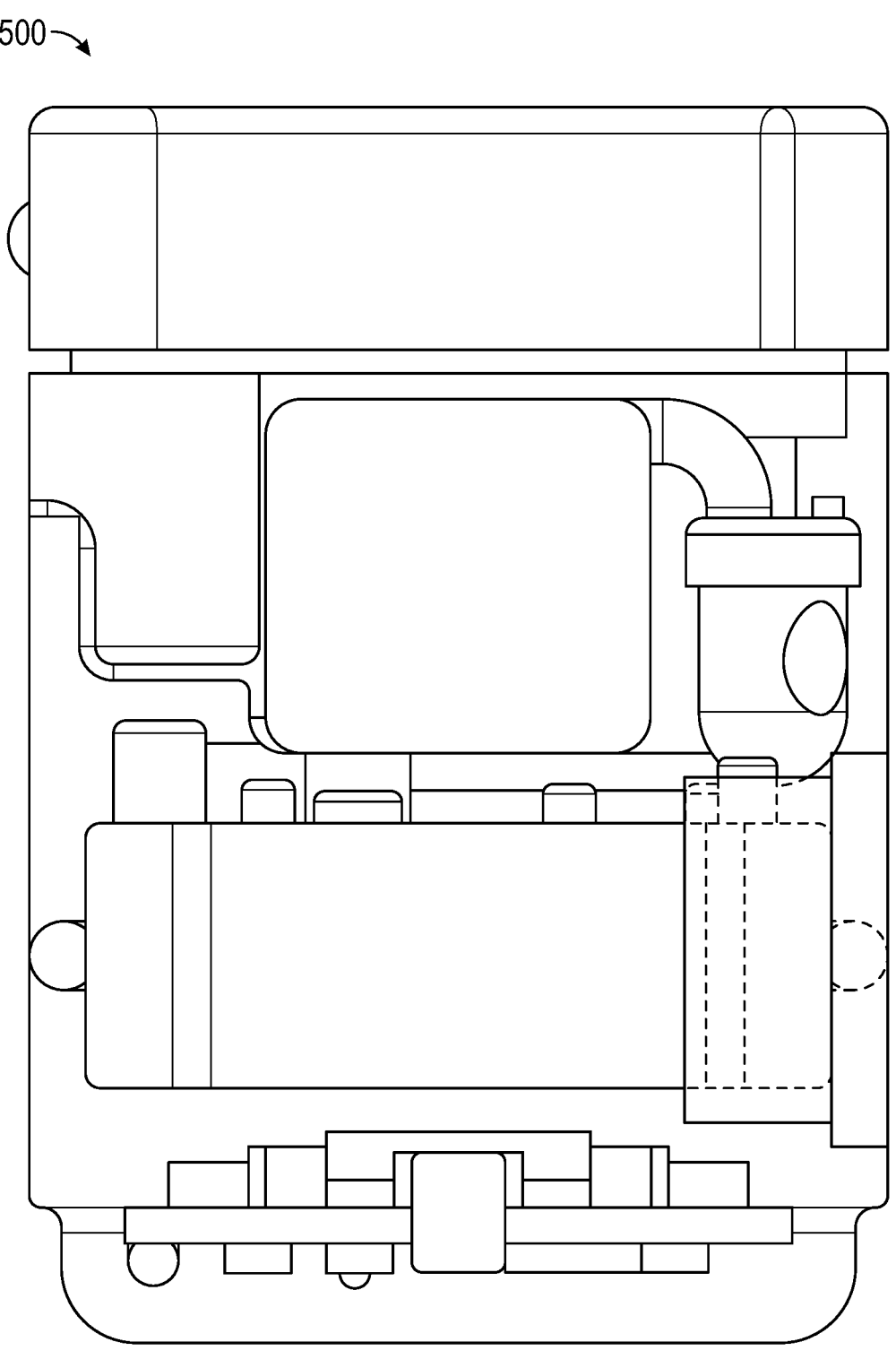
FIG. 24 is a top view of the hybrid power supply of FIG. 6.

Referring now to FIG. 18, a charging trailer 1800 is shown according to an exemplary embodiment. Charging trailer 1800 includes a hybrid power supply 500, according to some embodiments. A controller with a converter converts alternating current electrical power from an alternator to direct current electrical power (DC power) and supplies the power to an electrically coupled busbar 1811. The busbar 1811 is configured to receive and supply DC power to a plurality of plugs 1820, 1830, 1840. The plugs 1820, 1830, 1840 may be removably coupled to the busbar 1811. For example, each plug 1820, 1830, 1840 may slide on and off of a receiver 1812 on the busbar 1811 without the use of tools. The plugs 1820, 1830, 1840 may each be configured to output DC or AC power with different amperages and voltages. For example, plugs 1820 may be configured to output AC power via a standard AC outlet 1821 (e.g., 120-volt AC outlet, 240-volt AC outlet, etc.). Plugs 1820 may include an inverter to convert the DC power to stable AC power. Batteries 1822 configured to be charged with AC power, for example, hand tool batteries, can be coupled to the AC outlets 1821 of plugs 1820 via wires 1823. Plugs 1830 may be configured to output DC power (e.g., 15-amp DC power) via a DC outlet 1831. Thus, the plugs 1830 do not require an inverter. The DC power may be used, for example, to charge removable batteries 1832 via wires 1833. Plugs 1840 may be configured to output higher current DC power (e.g., 50-amp DC power) via a DC outlet 1841. Thus, the plugs 1840 do not require an inverter. The DC power may be used, for example, to charge outdoor power equipment, such as ZTR mowers 1842 via wires 1843. The plugs 1820, 1830, 1840 can be removed and replaced depending on the output required by the batteries to be charged. The power supply 1810 may include a display screen 1855 (e.g., a touchscreen, a user interface, etc.) that a user may use to select the operational mode of and otherwise control the power supply 1810.

The hybrid power supply 500 may include a battery 1850 (e.g., a primary battery), electrically coupled to the generator 1805, that can store charge and supply additional DC power to the busbar 1811. The battery 1850 may be charged using grid power and then may be used to charge the batteries of the various outdoor power equipment and tools on the charging trailer 1800. The battery 1850 can supply power to the busbar 1811 to silently charge the other batteries without emissions. This may be especially useful in residential landscaping settings where noise is a concern. In some embodiments, the battery 1850 and the generator 1805 can supply power to the busbar 1811 simultaneously. This may allow the generator 1805 to run at a lower output for reduced noise. The plugs 1820, 1830, 1840 may include both AC terminals for receiving AC power from the generator 1805 and DC terminals for receiving DC power from the battery 1850. In some embodiments, the generator 1805 may provide power to the busbar 1811 and may recharge the battery 1850 when the charging trailer 1800 is being towed. Thus, any noise generated by the generator 1805 will not be generated in one spot in a neighborhood and may not produce a substantial amount of noise in addition to the noise generated by the truck that is towing the trailer 1800. The battery 1850 may include an AC charging port so that the battery 1850 can be plugged into an outlet and charged using grid power, similar to a plug-in hybrid vehicle.

Operation of the Hybrid Power Supply

Figure 26:
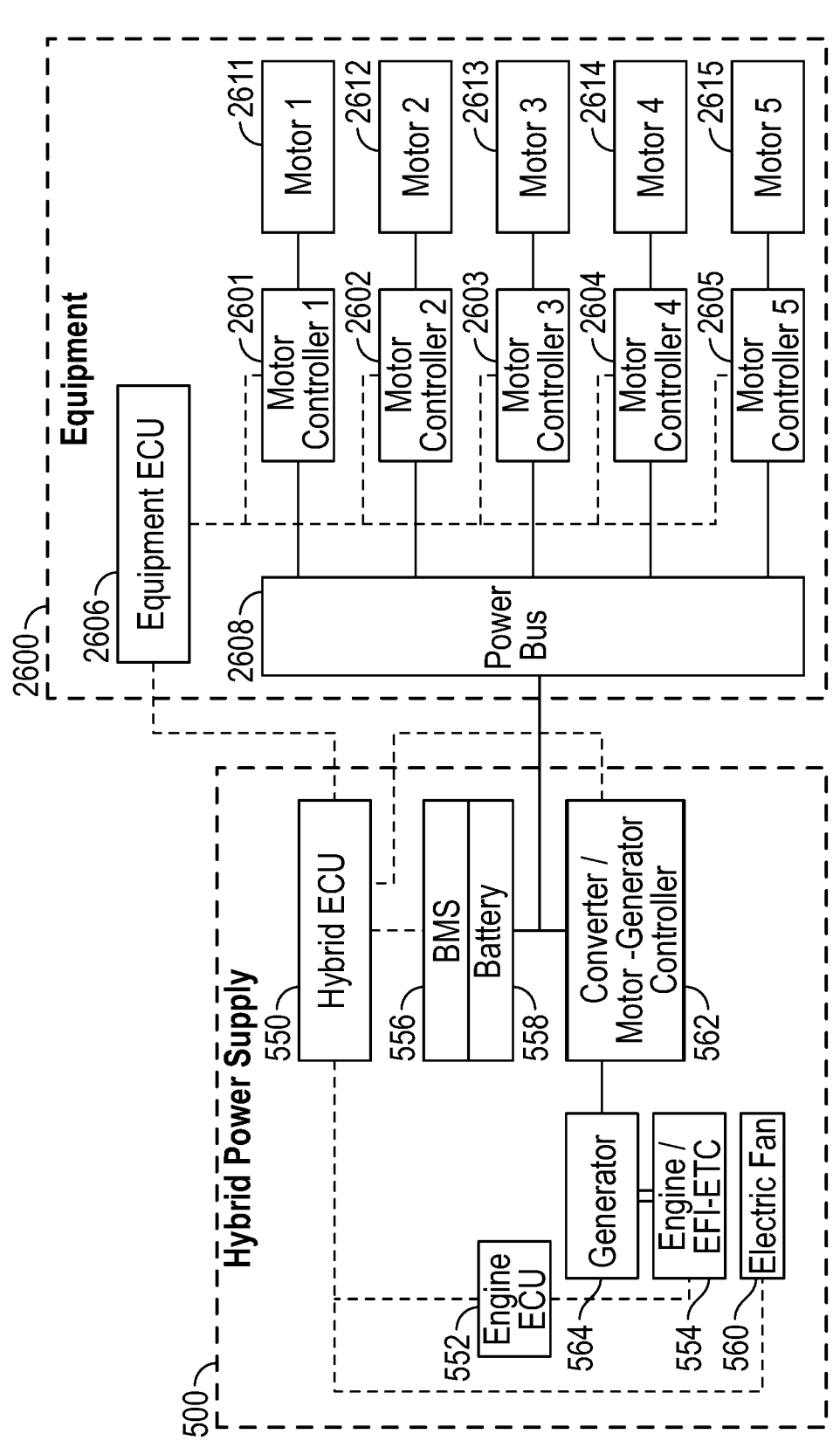
FIG. 26 is a schematic view of a hybrid power supply coupled to a piece of equipment, according to an exemplary embodiment.

Referring now to FIG. 26, a schematic diagram of a hybrid power supply 500 coupled to a piece of equipment 2600 is shown, according to some embodiments. The equipment 2600 may be, for example, outdoor power equipment (e.g., lawn mowers, riding tractors, snow throwers, fertilizer spreaders, salt spreaders, chemical spreaders, pressure washers, tillers, log splitters, zero-turn radius mowers, walk-behind mowers, wide area walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc.), chore devices, or other equipment. For example, the equipment 2600 may be the ZTR mower 10. The equipment may have an equipment electronic control unit 2606 (ECU) communicably coupled to and configured to control a plurality of motor controllers 2601-2605. The motor controllers 2601-2605 may be respectively communicatively and electrically coupled to and configured to control motors 2611-2615. Each of the motor controllers 2601-2605 and the associated motors 2611-2615 are electrically coupled to a power bus 2608. The power bus 2608 may be configured to receive power from a power source, such as the hybrid power supply 500 or a battery, via one or more electrical terminals (e.g., battery terminals). The power bus 2608 may be configured to receive DC power from the hybrid power supply 500. The motor controllers 2601-2605 may be configured to control the flow of power between the power bus 2608 and the motors 2611-2615 to control the rotational speed of the motors 2611-2615. The motors 2611-2615 may be configured to power components of the equipment 2600. For example, the first two motors 2611, 2612 may be coupled to drive wheels of the ZTR 10, and the remaining three motors 2613-2615 may be coupled to mower blades of the ZTR 10. Each motor controller 2601-2605 may independently control the rotational speed of the respective motor 2611-2615, so that the rotational speed of each wheel and each mower blade can each be independently controlled.

The hybrid power supply 500 may include a hybrid ECU 550 communicatively coupled to an engine ECU 552 of an engine 554, a battery management system 556 (BMS) of a battery 558 (e.g., a battery pack including one or more battery cells), a generator controller 562 of a generator 564

(e.g., a permanent magnet generator (PMG), an integrated starter generator (generator), etc.), and a fan 560. The hybrid ECU 550 may also be communicatively coupled to the equipment ECU 2606 to enable communication between the equipment 2600 and the hybrid power supply 500. The hybrid ECU 550 may receive information from the engine ECU 552, the BMS 556, and the equipment ECU 2606, and may use the information to control the operation of the hybrid power supply 500. For example, the hybrid ECU 550 may receive, from the engine ECU 552, an engine 554 running indicator, the revolutions per minute (RPM) of the engine 554, a temperature of the engine 554, an engine 554 load, fuel consumption information for the engine 554, and malfunction indicator codes for the engine 554. The hybrid ECU 550 may receive, from the BMS 556, a state of charge (SOC) or capacity of the battery 558, a discharge current limit for the battery 558, a regenerative charging current limit for the battery 558, and a voltage of the battery 558. The hybrid ECU 550 may receive, from the generator controller 562, a generator 564 current, a temperature of the generator controller 562, and a stator temperature of the generator 564.

The hybrid ECU 550 may also receive information from the equipment ECU 2602. In some embodiments, the hybrid ECU 550 may receive only an ON/OFF status from the equipment ECU 2602. For example, an operator of the equipment 2600 may engage a button or switch or turn a key indicating a desire to activate the equipment 2600. The equipment ECU 2602 may send an ON signal to the hybrid ECU 550, and the hybrid ECU 550 may control the hybrid power supply 500 to supply power to the equipment 2600. No further communication may be required between the equipment 2600 and the hybrid power supply 500. The hybrid ECU 550 may control the components of the hybrid power supply to maintain a nearly constant output voltage. Thus, unlike equipment that is driven only by a non-hybrid engine, the engine 554 of the hybrid power supply 500 may not be required to immediately respond to changes in load from the motors 2611-2615. The hybrid power supply 500 may essentially function like a battery pack with a built-in backup generator to charge the battery 558 when needed. In some embodiments, no control modifications may be required for the hybrid power supply 500 to replace a battery powering the equipment 2600.

The hybrid ECU 550 may be configured to monitor the voltage of the battery 558. For example, the hybrid power supply 500 (e.g., the BMS 556) may include a sensor or voltmeter configured to measure the output voltage from the battery 558. The measurements from the BMS 556 may be communicated to the hybrid ECU 550. When the hybrid ECU 550 detects that the voltage falls below a predetermined range, the hybrid ECU 550 may send an instruction to the engine ECU 552 to start the engine 554. The predetermined voltage range may have lower limit that is a predetermined threshold above the minimum operating voltage of the equipment 2600 (e.g., 1.V, 0.5V, 1V, etc. above the minimum operating voltage of the equipment 2600). For example, the hybrid ECU 550 may be configured to provide power to equipment 2600 that requires 48V to operate. The BMS 556 may periodically or continuously send voltage measurements for the battery 558 to the hybrid ECU 550. When the hybrid ECU 550 receives a voltage measurement that is below 48.5V, for example, the hybrid ECU 550 may send a message to the engine ECU 552 instructing the engine ECU 552 to activate the engine 554 or increase the engine speed. The engine 554 turns a crankshaft coupled to the generator 564, which converts the rotational energy into electrical power. The generator 564 outputs three-phase AC power and the generator controller 562 converts the three-phase AC power to DC power and the DC power is supplied to the battery 558 and/or the power bus 2608. Increasing the speed of the engine 554 may increase the charge rate of the battery 558 or power output to the power bus 2608. As discussed above with respect to FIGS. 1-3 and 19-24, the generator 564 may include an alternator including a rotor coupled to a crankshaft of the engine 554 and a stator. The rotor may rotate with the crankshaft to induce an alternating current in the stator. In some embodiments, the hybrid ECU 550 may monitor a rate of change of the battery 558 voltage to determine when to activate the engine 554. For example, if the battery 558 is discharging rapidly, the hybrid ECU 550 may send an instruction to activate the engine 554 while the battery 558 voltage is higher than if the engine 554 were discharging slowly. In some embodiments, the hybrid ECU 550 may monitor an average voltage of the battery 558 over a period of time (e.g., a trailing average, a rolling average), rather than monitoring instantaneous voltage. For example, the hybrid ECU may receive or may calculate an average voltage measurement for the battery 558 over the previous five seconds. The rate of change of the five-second average voltage may be monitored to determine when the engine 554 should be activated. The rate of change of the battery 558 voltage may also be used to determine the speed that the engine 554 should run. For example, if the battery 558 is discharging rapidly, and the voltage is dropping quickly, the hybrid ECU 550 may instruct the engine ECU 552 to operate the engine 554 at a high speed to rapidly recharge the battery 558. If the battery 558 is discharging slowly, and the voltage is dropping quickly, the hybrid ECU 550 may instruct the engine ECU 552 to operate the engine 554 at a low speed to slowly recharge the battery 558. The engine 554 may produce significantly more noise when operating at a high speed than at a low speed. Thus, it may be desirable to maintain the engine at a low speed when possible. By monitoring the rate of change of the voltage of the battery 558, it can be determined when operating the engine 554 at a low speed will be sufficient to maintain the battery 558 voltage and when it is absolutely necessary to operate the engine 554 at a high speed.

In some embodiments, the hybrid ECU 550 may also send instructions to the generator controller 562 to control the energy generation rate (e.g., a generation percentage of a maximum generation rate) of the generator 564. The generator controller 562 may adjust the current flowing through an electromagnet of the generator 564 to adjust the power output from the generator 564. For example, the generator controller 562 may use pulse width modulation (PWM) to control the current flowing to the coils of the rotor of the generator 564, thereby adjusting the power output from the generator 564. The generator controller 562 may include a converter (e.g., a rectifier) configured to convert alternating current power generated by the generator 564 to DC power that can be used to charge the battery 558 and/or supply power to the power bus 2608. By controlling the speed of the engine 554 and the energy generation rate of the generator 564, the hybrid ECU 550 may control the rate of charge of the battery 558. In some embodiments, the generator controller 562 may include a buck-boost converter. The buck-boost converter may be configured to adjust the voltage of the DC power output to account for changes in the voltage output by the generator 564, which is dependent on the speed of the engine 554. This may allow the engine 554 to run over the entire speed range of the engine 554, rather than within a small window of engine speeds to maintain a specific voltage output. For example, the engine 554 may be run at a lower speed that corresponds with an output voltage from the generator 564 that is below a target system voltage measured by the BMS 556 and the generator controller 562 can still output DC power at the target voltage (e.g., a voltage sufficient to charge the battery 558 and/or power the equipment 2600) by using the buck-boost converter to increase the output voltage to meet the target system voltage. Thus, the voltage of the DC power output by the generator controller 562 can be maintained independently from the speed of the engine 554.

In general, the control of the DC power output from the hybrid power supply 500 to the power bus 2608 is controlled based on monitoring of the BMS 556, which is integrated into the hybrid power supply 500 itself and enables the hybrid ECU 550 to minimally require ON/OFF commands from the equipment ECU 2606. For example, control of the hybrid power supply 500 is based on features internal to the hybrid power supply 500 so it only needs to know when to supply DC power to the power bus 2608 and when to stop supplying DC power to the power bus 2608. When the hybrid power supply 500 is providing DC power to the power bus 2608, the hybrid ECU 550 may monitor one or more parameters from the BMS 556 to control a speed of the engine 554 and/or the PWM signal from the generator controller 562 to the generator 564. In some embodiments, the hybrid ECU 550 monitors a voltage or a state of charge (SOC) (e.g., milliamp-hours remaining determined by a shunt voltage measurement) from the BMS 556, which are measured from the battery 558 by the BMS 556 and communicated from the BMS 556 to the hybrid ECU 550 over a controller area network (CAN) bus. For example, the hybrid ECU 550 may monitor the voltage or SOC from the BMS 556 and increase/decrease a speed of the engine 554 (via communication with the engine ECU 552) and/or adjust the PWM signal output by the generator controller 562 (via communication with the generator controller 564) to maintain a target system voltage or target system SOC. In some embodiments, the hybrid ECU 550 may adjust the engine speed and/or the PWM signal output by the generator controller 562 to maintain the voltage measured by the BMS 556 between a high voltage limit and a low voltage limit. In some embodiments, the hybrid ECU 550 monitors a rate of change of voltage or a rate of change of SOC (e.g., milliamp-hours/second). For example, the hybrid ECU 550 may adjust the DC power output from the hybrid power supply 500 (e.g., engine speed or the PWM signal from the generator controller 562) based on values of the rate of change of voltage or rate of change of SOC.

In some embodiments, the DC power generated by the generator controller 562 (e.g., converted from the alternating current generated by the generator 564) may be supplied directly to the equipment 2600 rather than charging the battery 558. The generator controller 562 and the battery 558 may each be electrically connected to the power bus 2608 to allow, allowing for the DC power to travel between the equipment (e.g., the power bus 2608) and the hybrid power supply 500 (e.g., the IMG controller 562 and the battery 558). In some embodiments, the hybrid power supply 500 may not be configured to output alternating current to a load external to the hybrid power supply 500 (e.g., the equipment 2600). For example, the hybrid power supply 500 may only be configured to output DC power to an external load, such as the equipment 2600. The alternating current power produced by the alternator (e.g., the generator 564) may be provided only to the converter of the generator controller 562 for conversion to DC power. Because the hybrid power supply 500 is configured to output only DC power, the hybrid power supply 500 may replace a battery pack in equipment 2600 configured to be battery-powered.

In some embodiments, the hybrid ECU 550 may receive additional information from the equipment ECU 2602. For example, the equipment ECU 2602 may send a mode of operation of the equipment 2600 to the hybrid ECU 550, for example, based on an operator selection on a user interface of the equipment 2600. For example, the equipment ECU 2602 may operate the equipment in a Default Mode, a Power Mode, a Quiet Mode, a Fuel Efficiency Mode, or a Limp Home Mode. The hybrid ECU 550 may control the hybrid power supply 500 based on the mode received from the equipment ECU 2602. In the Default Mode, the hybrid ECU 550 control the hybrid power supply 500 to supply power to the equipment 2600 as needed and to activate the engine 554 as needed to charge the battery 558, as discussed above. In the Power Mode, the hybrid ECU 550 may instruct the BMS 556 to immediately respond to sudden requests for increased power from the equipment 2600. In the Default Mode, the BMS 556 may take longer to respond to requests for increased power so that battery 558 charge is conserved when the request for increased power is not sustained for a period of time. In the Power Mode, these requests may be immediately responded to. For example, an operator of the equipment 2600 may require a short burst of torque from one or more of the motors 2611-2615 and may, for example, briefly press down on an accelerator pedal of the equipment 2600. In Power Mode, the power may be immediately delivered to the equipment to power the motors 2611-2615 accordingly. In contrast, in Default Mode, the operator may have to press down on the accelerator pedal for an extra few seconds before the BMS 556 increases the power output from the battery 558 to the equipment 2600.

In Quiet Mode, the hybrid ECU 550 may control the hybrid power supply 500 to minimize the use of the engine 554 and/or to minimize the use of the engine 554 at high speeds. For example, the hybrid ECU 550 may limit the maximum rate of power delivered to the equipment from the battery 558 so that the engine 554 can recharge the battery 558 while operating at low speeds. In Fuel Efficiency Mode, the hybrid ECU 550 may control the hybrid power supply 500 such that, when the engine 554 is activated, the engine 554 operates at its most fuel-efficient speed. Higher engine 554 speeds may charge the battery 558 faster but may be less fuel-efficient and an intermediate speed. Lower engine 554 speeds may result in lower hybrid power supply 500 noise levels but may be less fuel efficient than an intermediate speed. In Fuel Efficiency Mode, the engine ECU 552 may control the engine 554 to operate at a speed that maximizes fuel efficiency whenever possible. The BMS 556 may limit the power output from the battery 558 in Fuel Efficiency Mode to ensure that the engine 554 can keep up with the power output to recharge the battery 558 and maintain the voltage of the battery 558 above a lower limit.

In Limp Home Mode, the hybrid ECU 550 may instruct the BMS 556 to limit the power output from the battery 558 to a level at which the drive motors of the equipment 2600 (e.g., wheel motors 2611, 2612, of ZTR mower 10) can operate to return the equipment 2600 to a maintenance area or transport trailer, but not enough power is provided to operate the chore or tool motors (e.g., the blade motors 2613-2615). Limp Home Mode may be activated when a fault or malfunction is detected in the engine 554, the battery 558, or other component of the hybrid power supply 500 and may allow an operator to return the equipment 2600 to a location where it can be repaired while preventing the normal operation of the equipment. In some embodiments, the hybrid ECU 550 may automatically activate Limp Home Mode based on a detected malfunction in the hybrid power supply 500, rather than based on an operator selection via a user interface.

In some embodiments, the hybrid ECU 550 may receive information from the equipment ECU 2602 identifying the type of equipment 2600, the model number of the equipment 2600, the amount of power required to operate the components of the equipment 2600. The hybrid ECU 550 may use this information to adjust the operation of the hybrid power supply 500. For example, in Limp Home Mode, the hybrid ECU 550 may query a database to determine, based on the model number of the equipment 2600, how much power is required to operate the drive motors of the equipment 2600. The hybrid ECU 550 may use this information to determine the power output limit for the battery 558 so that only enough power is provided to the equipment to operate the drive motors and some ancillary components (e.g., user interfaces, gauges, etc.). The power output from the battery 558 in Limp Home Mode may be insufficient to power every motor 2611-2615 of the equipment 2600 simultaneously. For example, the power may only be sufficient to power the drive motors (e.g., wheel motors 2611-2612) but not the chore motors (e.g., blade motors 2613-2615). In some embodiments, the hybrid ECU 550 may be flashed with a control algorithm based on customer needs or equipment requirements. For example, if a customer wanted to ensure that the hybrid power supply 500 was always operated in Quiet Mode, a control algorithm may be uploaded to the hybrid ECU 550 causing the hybrid ECU 550 to only operate the hybrid power supply 500 in Quiet Mode. The control algorithm may also specify a minimum voltage of the battery 558 before the engine 554 should be used to recharge the battery 558, as well as a maximum voltage of the battery 558 at which the engine 554 should stop recharging the battery 558. For example, equipment 2600 that is likely to generate a high amount of regenerative braking power from the motors 2611-2615 may stop charging the battery 558 via the engine 554 at a lower SOC than equipment that is likely to generate a low amount of regenerative braking power. Flashing or uploading a control algorithm to the hybrid ECU 550 allows for the operation hybrid power supply 500 to be customized for customer needs or for specific equipment requirements.

In some embodiments, the battery 558 may receive power from the motors 2611-2615 through regenerative braking. The motors 2611-2615 may be used to brake the wheels or tools that they are coupled to and in doing so may act as generators rather than motors. The power generated by the braking may be delivered to the battery 558 via the power bus 2608. In order to prevent overloading of the battery 558, the hybrid ECU 550 may control the engine 554 such that the engine 554 does not charge the battery 558 over a predetermined limit, so that any power generated by regenerative braking does not overload the battery 558. For example, the hybrid ECU 550 may instruct the engine ECU 552 to turn off the engine 554 any time the state of charge (SOC) of the battery 558 reaches 90% of its maximum capacity. Thus, 10% of the capacity of the battery 558 may be reserved for power generated by regenerative braking. As discussed above, the hybrid ECU 550 may also activate the engine 554 when the voltage (which is correlated to the SOC) of the battery 558 falls below a predetermined limit. Thus, the hybrid ECU 550 may operate the engine 554 to maintain the SOC and/or the voltage of the battery 558 between a lower limit that is higher than the minimum SOC and/or voltage of the battery 558 and an upper limit that is lower than the maximum SOC and/or voltage of the battery 558. When power generated by regenerative braking drives the SOC of the battery 558 over the upper limit, the hybrid ECU 550 may disable the engine 554 until the SOC falls back below the upper limit. In some embodiments, the hybrid ECU 550 may instruct the generator controller 562 to adjust the generation percentage of the generator 564 instead of or in addition to controlling the engine 554 speed to adjust the power output from the generator 564.

The hybrid ECU 550 may also control the engine 554 to prevent an oversupply of current to the battery 558. The battery 558 has a maximum charge rate (e.g., the maximum amount of current that the battery 558 can receive to charge the battery cells) above which the battery cells or other components can be damaged. The BMS 556 may send a message to the hybrid ECU 550 indicating the amount of power being delivered to the battery 558 from the motors 2611-2615 via regenerative braking. The hybrid ECU 550 may instruct the engine ECU 552 to limit the speed of the engine 554 so that the power generated by the generator 564 combined with the regenerative braking power does not exceed the current limit of the battery 558. For example, the battery may have a maximum charge rate of 10A, if the BMS 556 determines that the motors 2611-2615 are supplying 7A of current to the battery 558 via regenerative braking, the hybrid ECU 550 may instruct the engine ECU 552 to limit the speed of the engine 554 such that the generator 564 supplies only 3A of current to the battery 558. In some embodiments, the hybrid ECU 550 may instruct the generator controller 562 to adjust the generation percentage of the generator 564 instead of or in addition to controlling the engine 554 speed to adjust the power output from the generator 564. For example, in the event of a sudden drop in load from the equipment 2600, the hybrid ECU 550 may detect a voltage change and instruct the generator controller 562 to drop the generation percentage of the generator 564 to zero (e.g., by setting the percentage of pulse width modulation to zero). For example, if the hybrid ECU 550 detects a change in voltage from the BMS 556 indicating that the current being supplied to the battery 558 exceeds the maximum charge rate of the battery 558, or if the hybrid ECU 550 receives a current measurement from the BMS 556 indicating that the current being supplied to the battery 558 exceeds the maximum charge rate of the battery 558, the hybrid ECU 550 may instruct the generator controller 562 to drop the generation percentage of the generator 564 to zero (e.g., set the PWM signal to the in a zero power-production state where the engine 554 is running but no power is being output by the generator controller 562). This may more immediately stop the generation of power from the generator 564 than deactivating the engine 554, which would take several seconds. This may prevent damage to or disconnection of the battery 558 if the regenerative braking power from the motors 2611-2615 plus the power generated by the generator 564 would exceed the maximum charge rate of the battery 558.

In some embodiments, the hybrid ECU 550 may control the speed of the fan 560 to maintain the temperature of the engine 554, the battery 558 and the generator 564 in a safe range. For example, the hybrid ECU 550 may receive one or more temperature measurements of the engine 554 from the engine ECU, of the battery 558 from the BMS 556, and of the generator 564 from the generator controller 562. When any of these measurements reaches an upper limit, the hybrid ECU 550 may increase the speed of the fan 560 to increase convective cooling and reduce the temperature of the components. As shown in FIG. 25, the fan 560 (e.g., similar to the fan 2508) may be positioned to draw in and/or blow air over each component that may exceed a safe operating temperature. The fan 560 may be reversible (e.g., may spin both clockwise and counterclockwise) to aid in clearing debris from the air intake vents (e.g., inlet vents 509) and/or to cool the hybrid ECU 550. For example, the hybrid ECU 550 may include a temperature sensor, and may cause the fan 560 to temporarily operate in the opposite direction of its default operation when the temperature of the hybrid ECU 550 exceeds a predetermined maximum in order to clear debris from the inlet vents 509.

Configuration of Exemplary Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

The present disclosure contemplates methods, systems, and program products on any machine-readable media for accomplishing various operations, e.g., of the controllers, the hybrid ECU 550, the engine ECU 552, the generator controller 562, the BMS 556, etc. The embodiments of the present disclosure may be implemented using existing computer processors, or by a special purpose computer processor for an appropriate system, incorporated for this or another purpose, or by a hardwired system. For example, the above-mentioned description, steps, procedures and/or processes including suggested steps can be implemented using hardware, software, firmware (known as a combination of a hardware device and computer instructions and data that reside as read-only software on the hardware device), an optical printer, or a combination thereof. Examples of hardware can include analog, digital, and mixed circuits known as microcircuits, microchips, or silicon chips. Examples of the optical printer may include a system on chip (SoC), system in package (SiP), a computer on module (COM), and an electrical system.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor (e.g., the flight control computer). By way of example, such machine-readable media can comprise read-only memory (ROM); flash memory; random access memory (RAM); EPROM; EEPROM; hard disk; other optical disk storage, magnetic disk storage, or magnetic storage devices; or any other medium which can be used to carry or store desired program code in the form of machine-executable instructions or data structures and which can be accessed by a general purpose or special purpose computer or other machine with a processor and executed to perform the various operations described herein.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

What is claimed is:

1. A hybrid power supply comprising:
an engine configured to rotate a crankshaft;
an electronic control unit (ECU) configured to control operation of the engine;
a generator comprising a rotor and a stator, the rotor coupled to and configured to rotate with the crankshaft to generate alternating current power;
a generator controller comprising a converter configured to convert the alternating current power to direct current power; and
a battery pack electrically connected to the generator controller,
wherein the generator controller and the battery pack are configured to be electrically connected to a power bus of an equipment to allow direct current power to travel between the equipment and the hybrid power supply,
wherein the ECU is configured to maintain the engine in a deactivated state or to maintain the generator is in a zero power-production state when a voltage of the battery pack exceeds a predetermined maximum voltage, wherein the predetermined maximum voltage is less than a maximum rated voltage of the battery pack.

2. The hybrid power supply of claim 1 wherein the ECU is configured to receive information from an equipment ECU of the equipment, wherein the information comprises only an ON/OFF status of the equipment.

3. The hybrid power supply of claim 1, further comprising a battery management system configured to measure the voltage or state of charge associated with the battery pack, wherein the ECU is configured to;
receive the measured voltage or state of charge from the battery management system; and
control one or more of a speed of the engine or a generation percentage of the generator based on the measured voltage or state of charge.

4. The hybrid power supply of claim 1, wherein the generator does not output alternating current power to an external load.

5. The hybrid power supply of claim 1, wherein the generator controller comprises a buck-boost converter configured to adjust an output voltage of the direct current power.

6. The hybrid power supply of claim 1, wherein:
the ECU is configured to receive an indication of an engine malfunction; and
in response to receiving the indication, the ECU is configured to operate in a Limp Home Mode in which power output from the battery pack is limited to an amount below a maximum power output of the battery pack.

7. Outdoor power equipment comprising:
a power bus configured to electrically connect to a battery via one or more battery terminals;
a first motor electrically connected to the power bus and configured to be driven by direct current power from the battery; and
a hybrid power supply comprising:
an engine configured to rotate a crankshaft;
an electronic control unit (ECU) configured to control activation of the engine;
a generator configured to convert the rotation of the crankshaft to alternating current power, the generator comprising a converter configured to convert the alternating current power to direct current power;
a user interface;
an equipment ECU configured to receive an indication of a selection of an operating mode from the user interface, wherein the ECU is configured to receive the indication of the selection of the operating mode from the equipment ECU, wherein the operating mode includes one of a quiet mode, a power mode, or a fuel efficiency mode; and
a battery pack electrically connected to the converter;
wherein the converter and the battery pack are electrically connected to the power bus to allow direct current power to travel between the hybrid power supply and the power bus.

8. The outdoor power equipment of claim 7, wherein the hybrid power supply is electrically connected to the power bus via the one or more battery terminals.

9. The outdoor power equipment of claim 7, wherein the ECU is configured to receive information from the equipment ECU, wherein the information comprises only an ON/OFF status of the equipment.

10. The outdoor power equipment of claim 7, wherein the hybrid power supply further comprises a battery management system configured to measure a voltage or state of charge associated with the battery pack, wherein the ECU is configured to:
receive the measured voltage or state of charge from the battery management system;

activate the engine and/or increase a generation percentage of the generator when the voltage measurement is below a first voltage, the first voltage being higher than a voltage required to operate the first motor; and deactivate the engine and/or set the generation percentage of the generator to zero when the voltage measurement exceeds a second voltage, the second voltage being below a maximum voltage associated with the battery pack.

11. The outdoor power equipment of claim 10, wherein the first motor is configured to apply a regenerative braking force, wherein the battery pack is configured to receive power generated by the first motor due to the regenerative braking force.

12. The outdoor power equipment of claim 11, wherein the ECU is configured to reduce a speed of the engine and/or the generation percentage of the generator in response to detecting power from the regenerative braking force being received by the battery pack.

13. The outdoor power equipment of claim 7, wherein the hybrid power supply further comprises:

one or more temperature sensors associated with the engine, the battery, and/or the generator and communicatively coupled to the ECU; and a fan communicatively coupled to the ECU;

wherein the ECU is configured to control a speed of the fan based on temperature measurements from the one or more temperature sensors.

14. The outdoor power equipment of claim 7, wherein the hybrid power supply further comprises a battery management system configured to measure a voltage or state of charge associated with the battery pack, wherein the ECU is configured to:

periodically or continuously receive the measured voltage or state of charge from the battery management system; and control one or more of a speed of the engine or a generation percentage of the generator based on a rate of change of the voltage or a rate of change of the state of charge.

15. The outdoor power equipment of claim 14, wherein the ECU is configured to set the generation percentage to zero in response to detecting a change in voltage indicating that a maximum rate of charge of the battery pack has been exceeded.

16. A hybrid power supply comprising:

an engine configured to rotate a crankshaft;

an electronic control unit (ECU) configured to control operation of the engine;

a generator comprising a rotor and a stator, the rotor coupled to and configured to rotate with the crankshaft to generate alternating current power;

a generator controller comprising a converter configured to convert the alternating current power to direct current power;

a battery pack electrically connected to the generator controller, wherein the generator controller and the battery pack are configured to be electrically connected to a power bus of an equipment to allow direct current power to travel between the equipment and the hybrid power supply; and a battery management system configured to measure a voltage or state of charge associated with the battery pack, wherein the ECU is configured to:

receive the measured voltage or state of charge from the battery management system; and control one or more of a speed of the engine or a generation percentage of the generator based on a rate of change of the measured voltage or a rate of change of the measured state of charge.

* * * * *